(12) United States Patent
Wu et al.

(10) Patent No.: US 7,385,947 B2
(45) Date of Patent: Jun. 10, 2008

(54) LOW-COST RADIO ACCESS NETWORK ENABLING LOCAL SWITCHING

(75) Inventors: Michael Wu, Austin, TX (US); Petteri Alinikula, Helsinki (FI); Rajesh Chandra Bansal, Acton, MA (US); Mika Skarp, Espoo (FI); Ram Gopal Lakshmi Narayanan, SanDiego, CA (US)

(73) Assignee: Nokia Corporation, Espoo (FI)

( * ) Notice: Subject to any disclaimer, the term of this patent is extended or adjusted under 35 U.S.C. 154(b) by 497 days.

(21) Appl. No.: 11/170,099

(22) Filed: Jun. 30, 2005

(65) Prior Publication Data

US 2006/0251008 A1    Nov. 9, 2006

Related U.S. Application Data

(60) Provisional application No. 60/677,323, filed on May 4, 2005.

(51) Int. Cl.
    *H04Q 7/00* (2006.01)
(52) U.S. Cl. .................. 370/328; 370/338; 455/422.1; 455/424; 455/428; 455/425.2; 455/446
(58) Field of Classification Search ............... 370/328, 370/338; 455/422.1, 424, 428, 425.2, 446
    See application file for complete search history.

(56) References Cited

U.S. PATENT DOCUMENTS

| 6,014,089 A * | 1/2000 | Tracy et al. | ........... 340/870.02 |
|---|---|---|---|
| 6,094,686 A * | 7/2000 | Sharma | ....................... 709/240 |
| 6,463,034 B1 * | 10/2002 | Abrol et al. | ................. 370/229 |
| 6,542,497 B1 * | 4/2003 | Curry et al. | ................. 370/352 |
| 6,597,912 B1 | 7/2003 | Lu et al. | |
| 2001/0039197 A1 | 11/2001 | Barkan | |
| 2002/0141358 A1 | 10/2002 | Requena | |

FOREIGN PATENT DOCUMENTS

| EP | 0 797 319 A2 | 9/1997 |
|---|---|---|
| WO | WO 2004/002177 A1 | 12/2003 |

* cited by examiner

*Primary Examiner*—Nghi H. Ly
(74) *Attorney, Agent, or Firm*—Squire, Sanders & Dempsey LLP

(57) ABSTRACT

An access-point node to a first network cell of a radio access network, to an access-center node and to a radio access network enable local service providers in rural areas to provide mobile telecommunication at low cost for end users. The access-point node of the invention is configured to establish, maintain, and release a local user-data radio channel, which consists of a first local channel section having as endpoints a first terminal device located in the network cell and the access-point node, and of a second local channel section having as endpoints the access-point node and a second terminal device located in the network cell. The access-point node is configured to exchange packetized user data and control data with an assigned superordinate access-center node for establishing, maintaining and releasing communication between the first terminal device and a third terminal device located outside the network cell. Link cost between the radio access network and the core network may be strongly reduced.

69 Claims, 25 Drawing Sheets

-PRIOR ART-

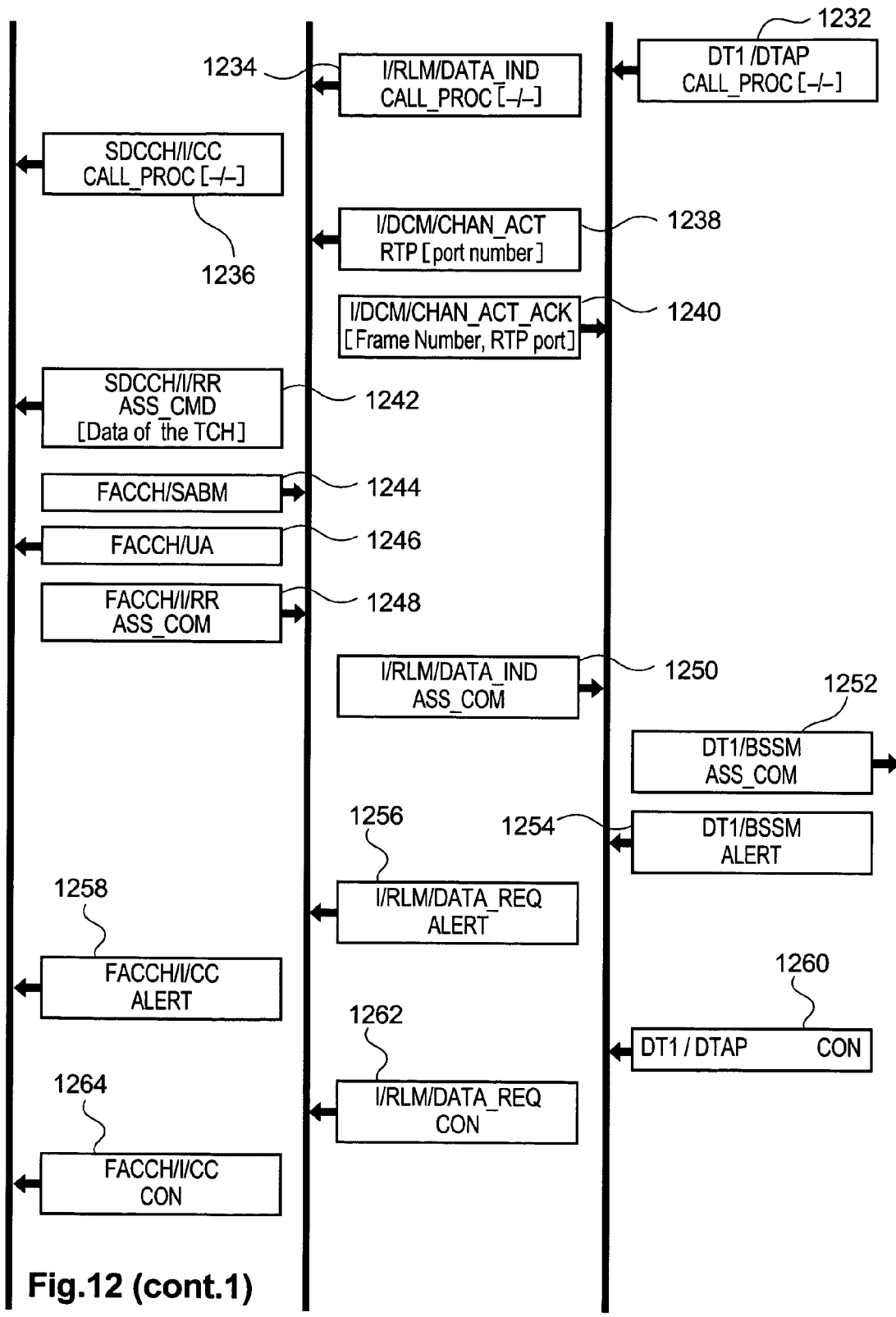
Fig.12 (cont.1)

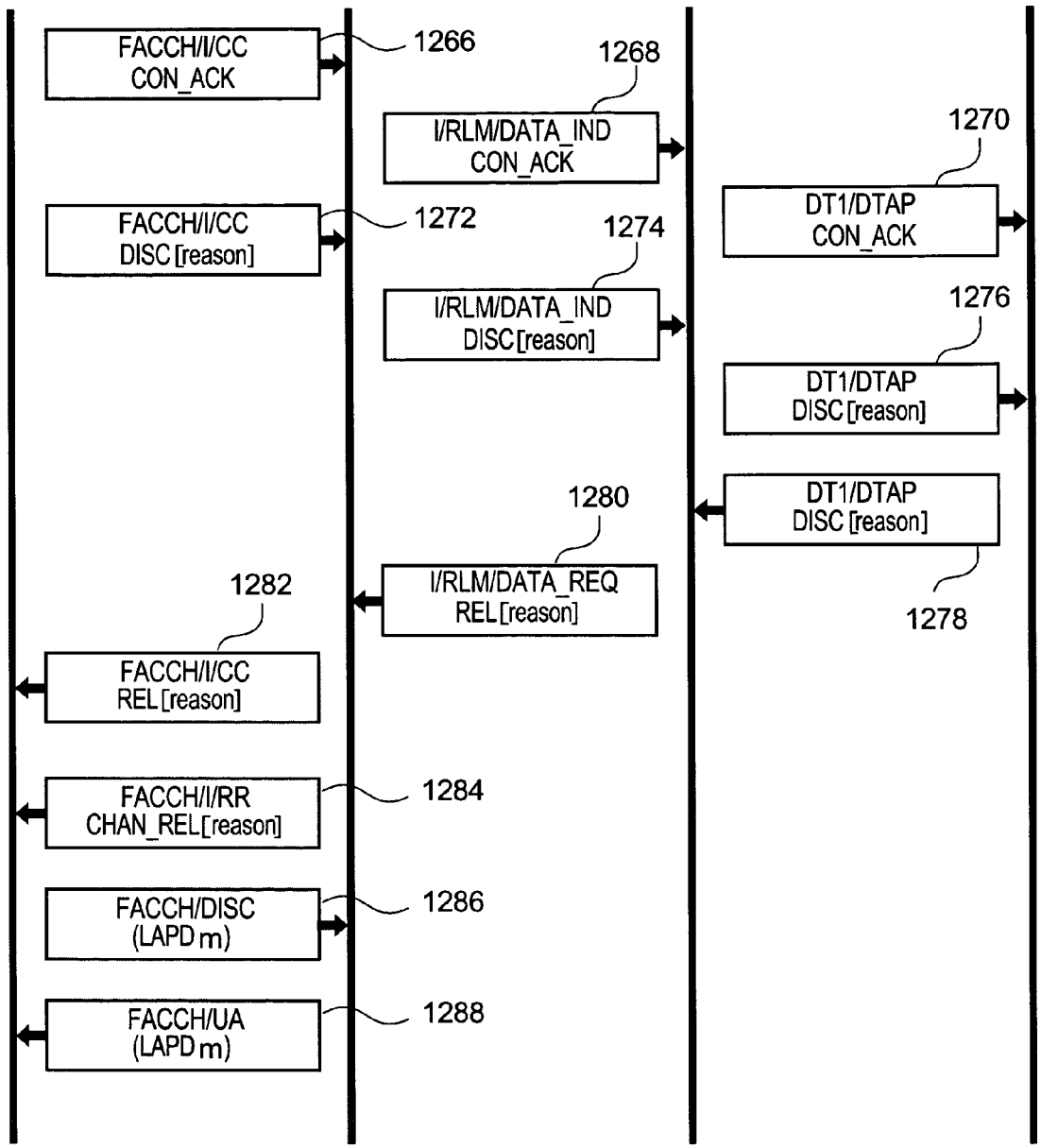
Fig.12 (cont.2)

LOW-COST RADIO ACCESS NETWORK ENABLING LOCAL SWITCHING

FIELD OF THE INVENTION

The invention relates to the field of telecommunications. In particular, the invention is related to a network structure providing wireless communication to terminal devices. Further, the invention relates to an access-point node to a network cell of a public land wireless access network, and to a radio access network for providing data communication.

BACKGROUND OF THE INVENTION

Wireless telecommunication services are today offered to a large fraction of the world's population. To this end, access networks have been installed, which allow an end user equipped with a terminal device for wireless communication making use of voice and data communication with other end users throughout the world. The currently most widespread technology standard used for wireless communication is the global system for mobile communication, short GSM.

In the following, the GSM architecture will be shortly summarized with reference to FIG. 1. FIG. 1 shows the essential components of a GSM public land mobile network (PLMN) 10 serving terminal devices TD1, TD2 and TD3. The terminal devices TD1 and TD2 are located in a first network cell 12 formed by the radio area coverage of the first base transceiver station (BTS) 14. A second and third BTS 16 and 18 cover second and third network cells 20 and 22. As can be seen from FIG. 1, several BTSs together are controlled by one base station controller (BSC) 24. Similarly, a second BSC 26 controls the first transceiver station 14. The combined traffic of terminal devices TD1 to TD3 in their respective network cells is routed through a mobile switching center MSC 28. Connections originating from or terminating in a fixed network such as a public switched telephone network (PSTN) or an integrated services data network (ISDN) are handled by a gateway mobile switching center (GMSC) 30.

The MSC 28 is connected to a number of databases for call control and network management. A home location register (HLR) 32 stores permanent data such as a user profile for users registered with a network operator. The HLR is accessed first, when a user's current location has to be determined in the case of a call. A visitor location register (VLR) 34 stores the data of users who are currently in a certain area. The VLR may also assign and store local data's such as a temporary identification. An authentication (AUC) 36 generates and stores security-related data such as keys used for authentication and encryption. An equipment identity register (EIR) 38 registers equipment data.

The base transceiver stations and the base station controllers for a base station subsystem of a GSM radio access network. The MSC, GMSC, HLR and VLR form components of a switching and management subsystem (SMSS).

Next, the functionality of a MSC is explained in more detail. The MSC forms a switching node of a GSM PLMN. In addition to providing all functionalities known from a switching node of a PSTN, an MSC further assigns and manages wireless resources and the mobility of terminal devices. Therefore, an MSC registers the current location of terminal devices and provides handover functionality for continued communication during the change of a terminal device from one network cell to another.

In establishing a call between terminal devices TD1 and TD2 located within identical network cells according to the GSM standard, both control data used for establishing the connection and user data, which form the actual user information to be transferred between the terminal devices, are routed from an originating terminal device, say TD1 to the BTS 14, BSC 26 and MSC 28, and back from MSC 28 to BSC 26, BTS 14 and TD2. The term control data is used herein with a general meaning to include both control requests or commands and control parameters related to a request or a command.

WO 2004/002177, which is incorporated herein by reference in its entirety, describes a method, in which the transmission path just described for a regular call between terminal devices can be switched to a shorter path for the transmitted user data, which involves only the base station subsystem (BSS) and does not access a core network.

The proliferation of wireless access networks typically ends in regions, where the majority of the population cannot afford to use wireless telecommunication services offered at a cost, which at least compensates the capital expenditure for installing and operating the access network. For this reason, wireless telecommunication services are not widely available in rural areas with a population that has too small an income to justify the investment of installing and operating a wireless access network.

Prototype systems are being given a trial in various markets, which provide wireless access through wireless local area networks based on IEEE 802.11 standards. Voice calls are enabled by using a voice-over-internet-protocol (VoIP)-technology. However, providing mobile coverage for rural environments is not economically feasible with this solution due to the dispersed population in rural areas and the low area coverage per access point. Efforts are being made to increase the area coverage and the transmission speed. However, the ability of the corresponding technologies based on IEEE 802.11 standards to provide high-speed access and large area coverage implies high power requirements and a higher cost for the chipset, which translates into higher overall system costs for a feature, which in the market under consideration is not of much relevance. For a rural market, low power consumption for both mobile devices and network nodes is an important requirement.

SUMMARY OF THE INVENTION

It is therefore an object of the invention to provide an access-point node to a network cell of a wireless access network, which allows to operate the network cell at low cost.

It is a further object of the present invention to provide an access-point node to a network cell of a wireless access network, which provides sufficient area coverage at low cost.

It is a further object of the present invention to provide an access-point node to a network cell of a wireless access network, which allows to provide mobile telecommunication services to users at low cost.

It is a further object of the present invention to provide an access-point node to a network cell of a wireless access network, which allows to provide mobile telecommunication services with reduced power consumption.

It is a further object of the invention to provide an access-point module for connection with a base transceiver station of a wireless access network, which allows to provide mobile telecommunication services to users at low cost.

It is a further object of the invention to provide an access-center node for providing data communication between a first access-point node in a first network cell and a second access-point node and located in a second network cell of a wireless access network, which allows providing communication between wireless terminal devices in the two network cells at low cost.

It is a further object of the invention to provide an access-center node for providing data communication between an access-point node in a first network cell and a core-network node, which allows providing communication between a terminal device in the first network cell and a terminal device, which can be reached via the core network.

It is a further object of the invention to provide an access-center module for connection with a base transceiver station or a base station controller of a radio access network and for the purpose of providing communication between at least two assigned subordinate access-point nodes to network cells of a radio access network, which allows providing communication between wireless terminal devices in the two network cells at low cost.

It is a further object of the invention to provide a radio access network allowing subscribers to the network the use of wireless communication services at low cost.

It is a further object of the invention to provide a method for providing wireless communication capability to a first terminal device located in a network cell of a radio access network, which allows subscribers to the network the use of wireless communication services at low cost.

According to a first aspect of the invention, an access-point node to a network cell of a radio access network is provided, comprising a call-processing unit, which is adapted to ascertain whether an incoming communication request originates from a terminal device located inside the network cell and whether the communication request is directed to a terminal device located inside the network cell, a local-switching unit, which is connected with the call processing unit and adapted to establish, maintain, and release upon reception of a communication request originating and terminating inside the network cell a local user-data radio channel, which consists of a first local channel section having as end-points a first terminal device located in the network cell and the access-point node, and of a second local channel section having as endpoints the access-point node and a second terminal device located in the network cell, and to establish, maintain, and release the first local channel section upon reception of a communication request, which is either originating from or terminating at the first terminal device inside the network cell, and further comprising a non-local-switching unit, which is connected with the call-processing unit and adapted to exchange packetized user data and control data with an as-signed superordinate access-center node for establishing, maintaining and releasing communication between the first terminal device located in the network cell and a third terminal device located outside the network cell.

The access-point node, herein also referred to as access point of the invention provides local switching functionality for connecting terminal devices located within the network cell covered by a transceiver unit connected with the access point. A local user data radio channel is established, maintained and released for such call requests. The user-data channel established by the access point of the invention has two local channel sections. A first local channel section extends from the first terminal device to the access-point node. The second local channel section extends from the access-point node to the second terminal device.

Duplex communication between terminal devices located within the same first network cell can thus be established without having to relay the user data to network nodes outside the first network cell. This way, communication between inhabitants of a rural area covered by the first network cell can be enabled without having to rely on an elaborated network structure and signaling requirements such as those formed by standard GSM networks. Instead of switching communication channels using central core-network nodes such as a MSC, switching functionality for local calls is provided by local access-point nodes. This measure allows to provide wireless communication at low cost.

The access-point node of the invention is further adapted to exchange packetized user data and control data with an assigned superordinate access-center node for establishing, maintaining and releasing communication between the first terminal device and a third terminal device located outside the network cell. This way, the transmission cost is further reduced. For packet-switched communication avoids the need to implement a costly E1 interface, which is necessary on the uplink between a BTS and a BSC in standard GSM networks.

The term control data as used herein comprises also control messages. An example of a control message is a Location-Update Request message or a call request message.

It is noted that the invention is not restricted to improving GSM components and protocols. The functionality of the access point of the invention can equally be provided within the framework of other wireless access network technologies such as CDMA (Code-Division Multiple-Access), WCDMA (Wideband Code-Division Multiple-Access) or UMTS (Universal Mobile Telecommunication System), CDMA2000,TDSCDMA (Time-Division Synchronous CDMA), WLAN (Wireless Local Area Network, also known in the art as IEEE 802.11).

In the following, preferred embodiments of the access point of the invention will be described. Unless otherwise noted, the embodiments can be combined with each other.

In order to further reduce the operation complexity and to allow the access point providing switching functionality, the local-switching unit of the access-point node is in one embodiment adapted to release the local user-data channel when one of the first and second terminal devices involved in a call within the same network cell is detected to have left this network cell.

In another embodiment, the local-switching unit access-point node is adapted to release the a local channel section of a communication between the first terminal device located within the network cell and the third terminal device located outside the network cell, when the local first terminal device is detected to have left the network cell.

The access-point node of these embodiments is liberated from handover functionality. This way, distributing a subset of the switching functionality, which in a prior-art GSM network would normally be provided by an MSC, to the local access-point node is enabled. The disadvantage of not being able to provide handover functionality to a subscriber of a terminal device is outweighed by the fact that the access point of these embodiments of the invention allows providing wireless telecommunication services at a cost, which is also affordable to subscribers with very low income.

The access-point node preferably is connected to a transceiver unit, which is adapted to generate and receive radio signals. The transceiver unit and the access point are preferably integrated into one device.

In a further embodiment of the access-point node the call-processing unit is adapted to decode and interpret control data received from the first or second terminal device and related to establishing, maintaining, or releasing the local user-data channel.

In another embodiment, the access-point node is further adapted to exchange control data with the first or second terminal device through at least one control-data radio channel. The local-switching unit is adapted to establish, maintain and release at least one local control-data radio channel consisting of two local channel sections, each having as endpoints at a respective terminal device and the access-point node.

In another embodiment of the access-point node the control-data radio channel is separate from the user-data radio channel. That is, the local-switching unit is adapted to exchange control data and user data through different radio channels.

A further embodiment of the access-point node has a first access database connected to the call-processing unit and comprising data related to terminal devices, which are permanently or temporarily registered to the access-point node. The first access data base may for instance contain data like an identification of the superordinate access-center node, an identification of the access-point node itself, IMSI numbers of subscribed users using the network cell of the access-point node as their home network cell, a telephone number assigned to subscribed users, and other useful information.

In another embodiment, the access-point node has a mobility-management unit, which is connected to the first access database and the call-processing unit and is adapted to maintain the first access database. Maintaining may for instance comprise either adding new data received from the access-center node or a terminal device or replacing existing data with new data, or both. Maintaining in one embodiments also includes generating a new entry and classifying it as a temporarily or permanently registered.

In another embodiment, the mobility-management unit of the access-point node is adapted to authenticate a terminal device located in the network cell and requesting authentication, on the basis of a successful validity check of the International-Mobile-Subscriber-Identity value, hereinafter IMSI value, of the subscribed user of the terminal device, in either the first access data base or a second access data base maintained at the assigned access-center node. Thus, authentication can be performed without contacting a core network.

In another embodiment, the mobility-management unit of the access-point node is adapted to
  extract the IMSI value from an authentication request message received from the requesting terminal device,
  to ascertain whether the IMSI value is allocated to a subscriber of a terminal device held as permanently registered to the access-point node in the first access data base, and
  to generate and transmit to the terminal device a random number.

Furthermore, the mobility-management unit of the access-point node of this embodiment may be adapted to update an entry of the terminal device in the first access data base if the IMSI value is allocated to a subscriber of a terminal device registered to the access-point node.

In a further embodiment, the mobility-management unit of the access-point node of the invention is adapted to
  send a first control message to the access-center node indicating that an IMSI contained in the authentication request message received from the terminal device is not contained in the first access database,
  wait for reception of a second control message from the access-center node indicating that the terminal device is registered with an external access-point node allocated to the same access-center node, and to
  generate and transmit to the terminal device a random number after receiving the second control message.

In one embodiment, the mobility-management unit is adapted to use a preconfigured seed value in generating the random number for all terminal devices registered to the access-point node.

In an alternative, preferred embodiment, the mobility-management unit is adapted to use the IMSI value of the subscribed user of the terminal device as a seed value in generating the random number.

In a further embodiment, wherein the mobility-management unit of the access-point node is further adapted to store in the first access data base an entry allocated to a terminal device requesting authentication, the entry indicating that the terminal device is currently in the coverage of the access-point node.

The mobility-management unit of the access-point node is preferably adapted to generate a control message for transmission to the access-center node, the control message indicating that the respective terminal device is currently in the coverage the access-point node.

In another embodiment, the mobility-management unit the access-point node is further adapted to perform an additional authentication procedure according to the GSM standard. This is preferably performed for devices, if the authentication is to be performed for a terminal device, which is not permanently registered to the access-point node.

In a further embodiment, the access-point node is adapted to update in the first access data base the current location of a terminal device in the coverage of the access-point node upon request by the terminal device or automatically after a predetermined time span following the last location update for the terminal device.

In another embodiment, the mobility-management unit is adapted to obtain from a terminal device within the coverage of the access-point node, upon request from the terminal device or automatically after a predetermined time span following the last location update for the terminal device, the IMSI value, a Temporal-Mobile-Subscriber-Identity value, hereinafter also TMSI value, and an International-Mobile-Equipment-Identity value, hereinafter also IMEI value.

In a further embodiment, the mobility-management unit is adapted to update the current location of a terminal device in the coverage of the access-point node in the first access database.

In another embodiment, the mobility-management unit of the access-point node is adapted to extract the IMSI value of the subscribed user of the terminal device from a location-update-request message, which is received from a terminal device.

In a further embodiment, the mobility-management unit of the access-point node is adapted to
  ascertain whether the received IMSI value is allocated to a subscribed user of a terminal device, who is held as registered to the access-point node in the first access data base, and
  send to the access-center node a third control message indicating the finding that the IMSI value of the subscribed user of the terminal device is not contained in the first access data base, wait for reception of a fourth control message from the access-center node indicating that the terminal device is registered with an external access-point node allocated to the same access-center node, and to send to the terminal device a fifth control message indicating completion of the location update, if the IMSI value is contained in the first access data base or the fourth control message has been received from the access-center node.

In a further embodiment, the access-point node comprises an administration and management unit, which is adapted to monitor the operation of the components of the access-point node and to collect and send report logs to a superordinate access-center node. The administration and management unit is preferably further adapted to periodically synchronize information stored in the access-point node, in particular information stored in the first access database, with the access center node. Such synchronization is also known as heartbeat operation.

Another embodiment of the access-point node of the invention further comprises a clock generation unit with a receiver, which is adapted to receive an external clock signal through a wireless channel, and which is adapted to derive an internal clock signal from the external clock signal. Preferably, the internal clock signal is provided to the transceiver unit.

In another embodiment, the call-processing and local-switching unit are adapted to perform signaling and call-switching functions for establishing, maintaining and releasing the local user-data channel according to the Signaling System standard SS7.

In another embodiment, the access-point node is adapted to packetize and send to the assigned access-center node control data received from the first terminal device in relation to the registration of the first terminal device with a core network connected with the access-point node.

The access-point node may comprise a packetizer, which is adapted to generate data packets according to the Internet Protocol, hereinafter IP, the data packets including either only user data or only control data or both.

The access-point node is in one alternative embodiment adapted to interpret and generate control data according to the Session Initiation Protocol, hereinafter SIP.

In one embodiment, the access-point node is adapted to communicate with the assigned access-center node through a wired communication channel.

In another embodiment, the access-point node is adapted to communicate with the assigned access-center node through a wireless communication channel. The wireless communication channel is preferably a bandwidth-limited microwave link.

According to a second aspect of the invention, an access-point module is provided for implementation in a base transceiver station of a radio access network, the access-point module comprising a call-processing unit, which is adapted to ascertain whether an incoming communication request originates from a terminal device located inside the network cell and whether the communication request is directed to a terminal device located inside the network cell, a local-switching unit, adapted to establish, maintain, and release a local user-data radio channel, which consists of a first local channel section having as endpoints a first terminal device located in the network cell and the access-point node, and of a second local channel section having as endpoints the access-point node and a second terminal device located in the network cell, and a non-local switching unit, adapted to exchange packetized user data and control data with an assigned superordinate access-center node for establishing, maintaining and releasing communication between the first terminal device and a third terminal device located outside the network cell, and an interface unit, which is connected with the call processing unit, the local-switching unit and the non-local switching unit and adapted to connect with the base transceiver station and to exchange control data and user data with the base transceiver station.

The access-point module allows implementing an access point according to the first aspect of the invention as a replacement or as an addition to an existing base transceiver station. In one embodiment, the access-point module is a hardware device. In another embodiment, it is formed by executable software on a data medium. After installation of the software, a base transceiver station is adapted to function like an access-point node.

Preferred embodiments of the access-point module of the second aspect of the invention have the additional features of the access-point node of the first aspect of the invention. The embodiments can be combined with each other.

According to a third aspect of the invention, an access-center node for providing communication between at least two assigned subordinate access-point nodes to network cells of a radio access network or between one assigned subordinate access-point node and an assigned superordinate core-network node comprises a call-control unit, which is adapted to ascertain whether an incoming communication request originates from a terminal device in a network cell of an assigned subordinate access-point node and whether the communication request is directed to a terminal device located inside a network cell of an assigned subordinate access-point node, a regional-switching unit, which is connected to the call-control unit and adapted to exchange packetized user data and control data with an assigned subordinate first access-point node to a first network cell and with an assigned subordinate second access-point node to a second network cell to establish, maintain and release a predefined transmission capacity for a regional packet-switched user-data transmission path consisting of a first regional transmission path section having as endpoints the first access-point node and the access-center node, and further consisting of a second regional transmission path section having as end-points the access-center node and the second access-point node, for establishing communication between a first terminal device located in the first network cell and a second terminal device located in the second network cell, and a wide-area switching unit, which is connected to the call control unit and adapted exchange packetized user data and control data with the first access-point node and with an assigned superordinate core network node in a core network for establishing, maintaining and releasing a wide-area user-data transmission path section consisting of the first regional transmission path section and a third regional transmission path section having as endpoints the access-center node and the core-network node.

The access-center node of the second aspect of the invention provides communication between assigned subordinate access-point nodes, and between the assigned access-point nodes and a core network. As such, the access-center node of the invention provides regional switching functionality that allows to perform calls between terminal devices in the coverage of two assigned subordinate access-point nodes of the invention, without including a core network in the related signaling. In addition, the access-node of the invention provides communication to the rest of the world by its wide-area switching unit. However, the connection to the core network need not be active for providing regional communication channels. Therefore, an autonomous regional wireless communication network is established by the combination of access-point nodes and access-center nodes of the invention. In addition, the access-center node provides access to a core network.

The signaling towards the core network is matched to the particular type of connected core network, which can be of any known type, such as a GSM core network, a CDMA core network, a public switched telephone network (PSTN), or an IP network via Voice over IP using the protocol H323 or the Session Initialization Protocol (SIP).

The access-center node has in one embodiment a memory containing a second access database comprising data related to terminal devices, which are permanently or temporarily registered to all assigned access-point nodes.

In another embodiment, the access-center node is adapted to maintain the second access database.

In a further embodiment, the access-center node is adapted
  to receive a first control message from an assigned first access-point node indicating that an IMSI contained in an authentication request message of a terminal device is not contained in its first access database,
  to ascertain whether the IMSI value is allocated to subscriber held as registered to one of the access-point nodes assigned to the access-center node, and
  to transmit a second control message to the requesting access-point node, the second control message indicating that the terminal device is registered with a second access-point node allocated to the same access-center node.

In another embodiment, the access-center node is further adapted to store in the second access data base an entry allocated to the terminal device requesting authentication, indicating that the terminal device is currently in the coverage of the access-point node, which sent the first control message.

In another embodiment, the access-center node is further adapted to
  receive from an assigned first access-point node a third control message indicating the finding that an IMSI value of a subscriber, for which a location update procedure is being performed at the access-point node, is not contained in its first access data base,
  to ascertain whether the IMSI value is allocated to a subscriber held as registered to one of the access-point nodes assigned to the access-center node, and
  to transmit a fourth control message to the requesting first access-point node indicating that the terminal device is registered with a second access-point node allocated to the same access-center node.

In a further embodiment, the access-center node is further adapted to send a sixth control message to the second access-point node requesting a validity status of the IMSI value received from the first access-point node, to wait for a seventh control message indicating the validity status, and to transmit the fourth control message to the requesting first access-point node only if the seventh control message indicates that the IMSI value is valid.

In one embodiment, the access-center node is further adapted to
  send to the gateway node an eighth control message indicating the finding that the IMSI value of a subscriber of the terminal device is not contained in the second access data base,
  wait for reception of an ninth control message from the gateway node indicating that the subscriber is registered with an external radio access network, and to
  send to the first access-point an tenth control message indicating that finding.

In another embodiment, the access-center node is adapted to generate data packets according to the Internet Protocol, hereinafter IP, the data packets including either only user data or only control data or both.

In a further embodiment, the access-center node is adapted to interpret and generate control data according to the Session Initiation Protocol, hereinafter SIP. The SIP-based approach has the advantage of allowing to store subscriber information outside the network of the operator of the wireless network. This way, the market can be opened to new providers beside the wireless operator.

In another embodiment, the access-center node is adapted to communicate with an assigned access-point node through a wired communication channel.

In another embodiment, the access-center node is adapted to communicate with an assigned access-point node through a wireless communication channel.

In another embodiment, the access-center node is adapted to communicate with the core network, in particular, with an assigned gateway node in the core network, through a wired communication channel.

In a further embodiment, the access-center node is adapted to communicate with the core network, in particular, with the assigned gateway node in the core network through a wireless communication channel.

According to a fourth aspect of the invention, an access-center module is provided for implementation in a base transceiver station or in a base station controller of a radio access network and for the purpose of providing communication between at least two assigned subordinate access-point nodes to network cells of a radio access network or between one assigned subordinate access-point node and an assigned superordinate core network node, the access-point module being adapted to
  ascertain whether an incoming communication request is directed to a terminal device located inside a network cell of an assigned subordinate access-point node,
  exchange packetized user data and control messages with an assigned subordinate first access-point node to a first network cell and with an assigned subordinate second access-point node to a second network cell,
  establish, maintain and release a predefined transmission capacity for a regional packet-switched user-data transmission path consisting of a first regional transmission path section having as endpoints the first access-point node and the access-center node and of a second regional transmission path section having as endpoints the access-center node and the second access-point node, for establishing communication between a first terminal device located in the first network cell and a second terminal device located in the second network cell, and to
  exchange packetized user data and control messages with the first access-point node and with an assigned superordinate gateway node of a core network for establishing, maintaining and releasing communication between a first terminal device located in the first network cell and a fourth terminal device located in a third network cell of a third access-point node, which is not assigned to the access-center node, or in a network cell outside the radio access network.

The access-center module is formed by either executable software on a data medium or by a hardware module. It serves to implement the functionality of an access-center node in an existing base transceiver station or in a base station controller.

Embodiments of the access-center module have the additional features of the described embodiments of the access-center node of the third aspect of the invention. Embodiments can be combined with each other.

According to a fifth aspect of the invention, a radio access network is provided comprising a first number of access-point nodes according to the first aspect of the invention or one of its embodiments, or according to a combination of its embodiments, and a second number of access-center nodes according to the third aspect of the invention, or one of its embodiments, or a combination of its embodiments. Each access-point node is assigned to one of the access-center nodes. The access point-nodes or access-center nodes may be implemented by the corresponding modules of the second and fourth aspects of the invention.

In one embodiment implementing SIP signaling, the radio access network has at least one access-center node, and further comprises a protocol-mapping node, which is adapted to communicate with a gateway node of the core network and with the second number of access-center nodes and to translate control data of a first communication protocol used by the predetermined core-network node into SIP control data, and to translate SIP control data into control data of the first communication protocol.

In another embodiment, the radio access network further comprises a home-location database node, which is adapted to communicate with an accesscenter-node according to the SIP and to store and provide to the access-center node permanent subscriber information allocated to each terminal-device address registered to the radio access network.

Preferably, also a visitor-location database node is provided, which is adapted to communicate with an access-center-node according to the SIP and to store and provide varying subscriber information allocated to each terminal-device address registered to the access network.

According to a sixth aspect of the invention, a method for providing wireless communication capability to a first terminal device located in a network cell of a radio access network, comprising the steps of ascertaining at an access-point node located in the network cell of the first terminal device whether an incoming communication request originates from the first terminal device and whether the communication request is directed to a second terminal device located inside the network cell, upon reception of a communication request originating and terminating inside the network cell: establishing and maintaining a local user-data radio channel, which consists of a first local channel section having as endpoints the first terminal device located in the network cell and the access-point node, and of a second local channel section having as endpoints the access-point node and a second terminal device located in the network cell upon reception of a communication request, which is either originating from or terminating at the first terminal device inside the network cell: establishing and maintaining the first local channel section, and exchanging packetized user data and control data with an assigned superordinate access-center node for establishing, maintaining and releasing communication between the first terminal device and a third terminal device located outside the network cell.

In the following, preferred embodiments of the method will be explained. Unless otherwise stated, the embodiments may be combined to form further embodiments.

One embodiment further comprises a step of exchanging control data between the access-point node and the first or second terminal device through at least one control-data radio channel in establishing, maintaining or releasing the local user-data radio channel.

Another embodiment comprises a step of maintaining a first access database located at the access-point node and comprising data related to terminal devices, which are permanently or temporarily registered to the access-point node.

This embodiment preferably further comprises the steps of sending a request for authentication from a terminal device located in the network cell to the serving access-point node performing a check of validity of the terminal device, wherein performing the check of validity comprises accessing the first access database or a second access database maintained at the assigned access-center node.

The step of sending the request for authentication preferably comprises including the IMSI value of the subscribed user of the terminal device into the request. This embodiment further comprises the steps of extracting the IMSI value from the authentication request at the access-point node, ascertaining at the access-point node whether the IMSI value is allocated to a subscriber held as registered to the access-point node in the first access data base, and generating and transmit to the terminal device a random number.

A further embodiment has a step of performing an additional authentication procedure according to the GSM standard for a terminal device not held as permanently registered to the access-point node or its assigned superordinate access-center node.

Another preferred embodiment comprises the steps of ascertaining whether the received IMSI value is allocated to a subscribed user held as permanently registered to the access-point node in the first access data base, and sending to the access-center node a third control message indicating the finding that the IMSI value of the subscribed user is not contained in the first access data base, waiting for reception of a fourth control message from the access-center node indicating that the terminal device is registered with an external access-point node allocated to the same access-center node, and sending to the terminal device a fifth control message indicating completion of the location update, if the IMSI value is contained in the first access data base or the fourth control message has been received from the access-center node.

Another embodiment of the method of the invention further comprises the steps of packetizing and sending to the assigned access-center node control data received from the first terminal device in relation to the registration of the first terminal device with a core network connected with the access-point node.

In another embodiment of the method control messages according to the Session Initiation Protocol, hereinafter SIP, are used.

In a further embodiment, providing wireless communication between the first terminal device and a third terminal device located in the coverage of a different access-point node further comprises ascertaining at the access-center node that the incoming communication request originates from the first terminal device and that the communication request is directed to a terminal device located inside a network cell of another assigned subordinate access-point node, upon reception of a communication request originating and terminating in network cells of assigned subordinate first and second access-point nodes: exchanging packetized user data and control data with the first access-point node and with the second access-point node to establish, maintain and release a predefined transmission capacity for a regional packet-switched user-data transmission path consisting of a first regional transmission path section having as endpoints the first access-point node and the access-center node, and further consisting of a second regional transmission path section having as endpoints the access-center node and the second access-point node.

In another embodiment, providing wireless communication between the first terminal device and a fourth terminal device located outside the coverage of the access-center node further comprises ascertaining at the access-center node that the incoming communication request involves the first terminal device and the fourth terminal device, exchanging packetized user data and control data with the first access-point node and with an assigned superordinate core network node in a core network for establishing, maintaining and releasing a wide-area user-data transmission path section consisting of a first regional transmission path section having as endpoints the first access-point node and the access-center node and a third regional transmission path section having as endpoints the access-center node and the core-network node.

The ascertaining steps preferably comprise accessing a second access data base located at the access-center node and having data related to terminal devices, which are permanently or temporarily registered to all access-point nodes assigned to the access-center node.

A further embodiment of the method comprises the steps of receiving at the access-center node a first control message from the first access-point node indicating that an IMSI value contained in an authentication request message of a terminal device is not contained in its first access database, ascertaining whether the IMSI value is allocated to a subscriber held as registered to one of the access-point nodes assigned to the access-center node, transmitting a second control message to the requesting access-point node, the second control message indicating that the subscriber is registered with a second access-point node allocated to the same access-center node.

Another embodiment further comprises a step of storing in the second access data base an entry allocated to the terminal device requesting authentication, indicating that the terminal device is currently in the coverage of the access-point node, which sent the first control message.

Another embodiment further comprises the steps of receiving at the access-center node from an assigned first access-point node a third control message indicating the finding that an IMSI value of a subscribed user of a terminal device, for which a location update procedure is being performed at the access-point node, is not contained in its first access data base, ascertaining at the access-center node that the IMSI value is allocated to a subscribed user held as registered to one of the access-point nodes assigned to the access-center node, transmitting a fourth control message to the requesting first access-point node indicating that the subscribed user is registered with a second access-point node allocated to the same access-center node.

The fact that an IMSI value belongs to a subscriber of a foreign network, that is, to a subscriber not registered with an access point under a particular access center, can in one embodiment be determined by the analyzing the IMSI number provided by the terminal device of the subscriber. Certain IMSI number regimes can be reserved for subscribers to access points of the invention, thus allowing a fast check at the access point or access center.

Thus, access-point node and the access-center node can determine that based on the IMSI values itself if a user does not belong to the access network of the invention, and the access-center node and access-point node are in one embodiment adapted to act as a prior-art GSM base station controller (BSC) and base transceiver station (BTS), respectively, for those terminal devices.

Another embodiment further comprises the steps of sending a sixth control message to the second access-point node requesting a validity status of the IMSI value received from the first access-point node, waiting for a seventh control message indicating the validity status, and transmitting the fourth control message to the requesting first access-point node only if the seventh control message indicates that the IMSI value is valid.

A further embodiment comprises the steps of sending to the gateway node an eighth control message indicating the finding that the IMSI value of a subscriber is not contained in the second access data base, waiting for reception of an ninth control message from the gateway node indicating that the subscriber is registered with an external radio access network, and sending to the first access-point an tenth control message indicating that finding.

In another embodiment, exchanging control data and exchanging user data between an access-point node and the access-center node, and between the access-center node and the core-network node comprises generating data packets according to the Internet Protocol, hereinafter IP, an individual data packet including either packetized user data or packetized control data or both.

DESCRIPTION OF THE PREFERRED EMBODIMENT

In the following, preferred embodiments of the invention will be described with reference to the enclosed figures.

A first embodiment, which will be described with reference to FIGS. 2 and 3 relates to a signaling scenario that is based on SS7.Service enrolment, authentication and location update procedures, which can be implemented in the network structure of this embodiment, will be described with reference to FIGS. 4 to 9.

A second embodiment, which will be described with reference to FIGS. 10 to 14 relates to a scenario based on signaling according to the Session Initialization Protocol (SIP).

1. SS7-based Access Network
1.1 Network Structure

Figure 1:
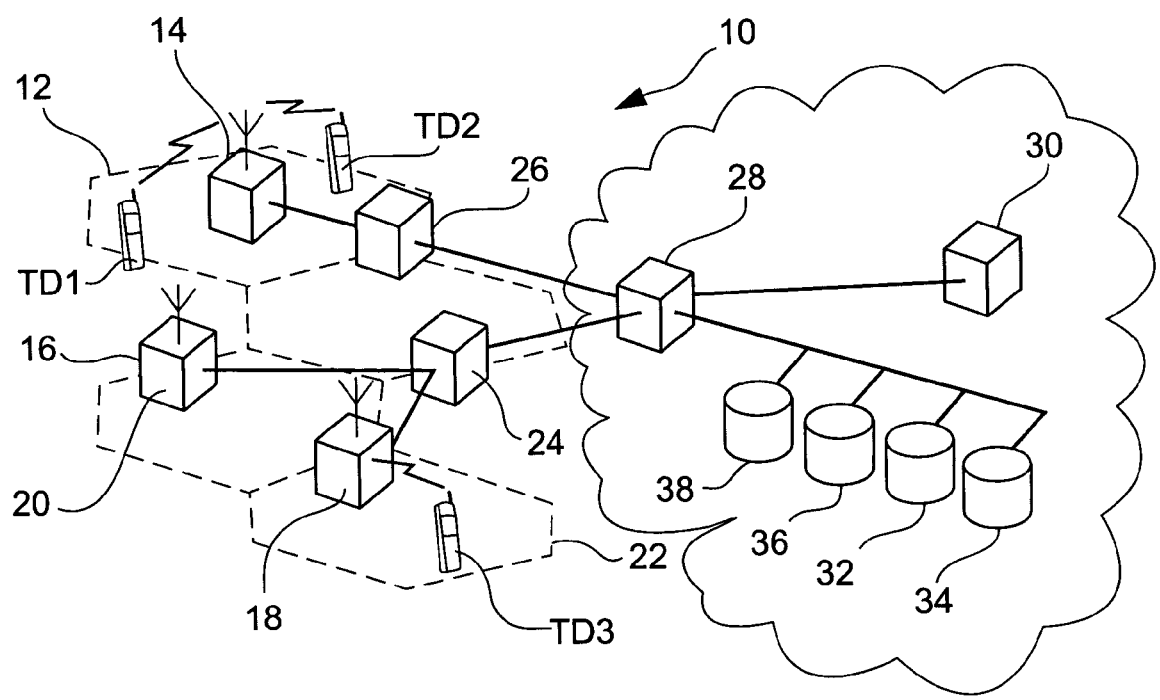
FIG. 1 shows a schematic diagram representing a structure of a GSM PLMN according to the prior art.
Figure 2:
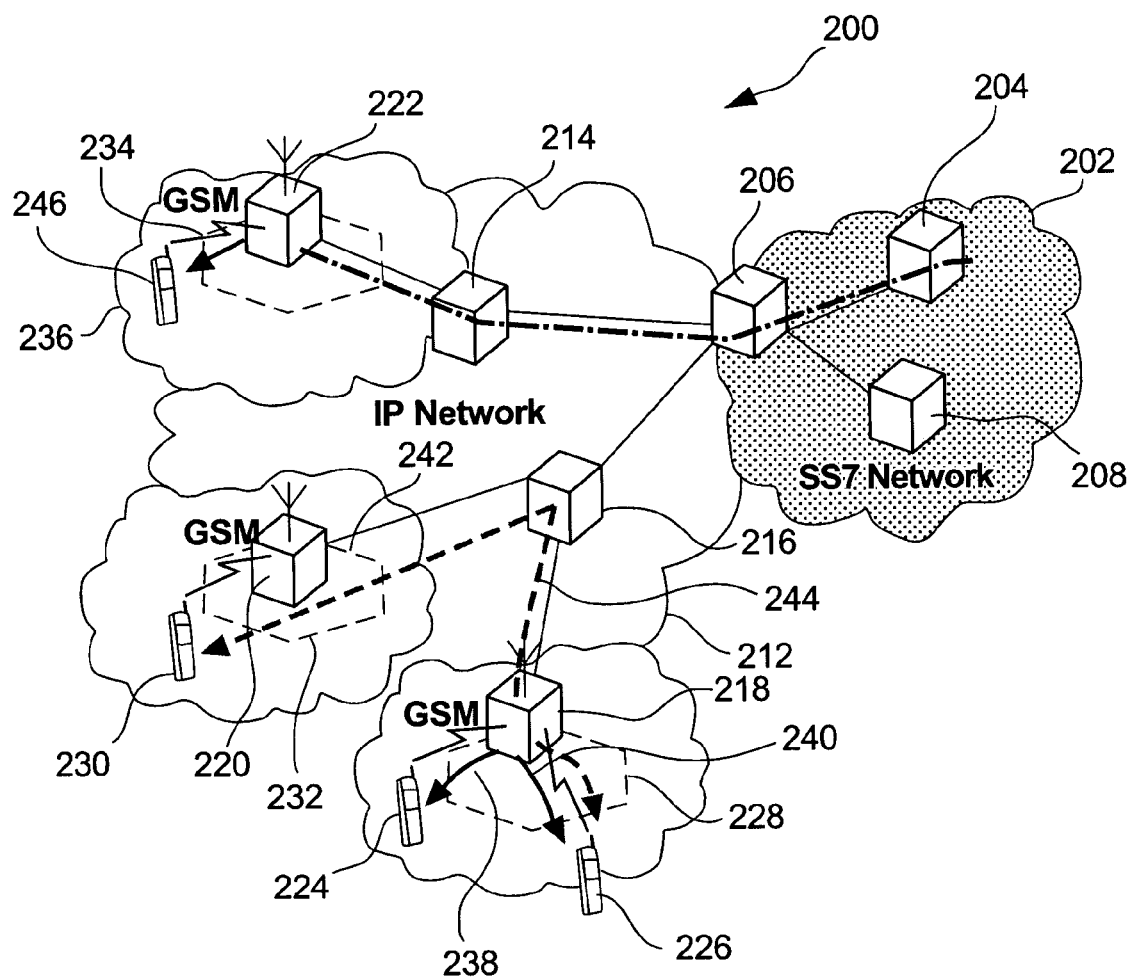
FIG. 2 shows a schematic diagram representing a structure of a GSM PLMN according to a first embodiment of the invention.
Figure 3:
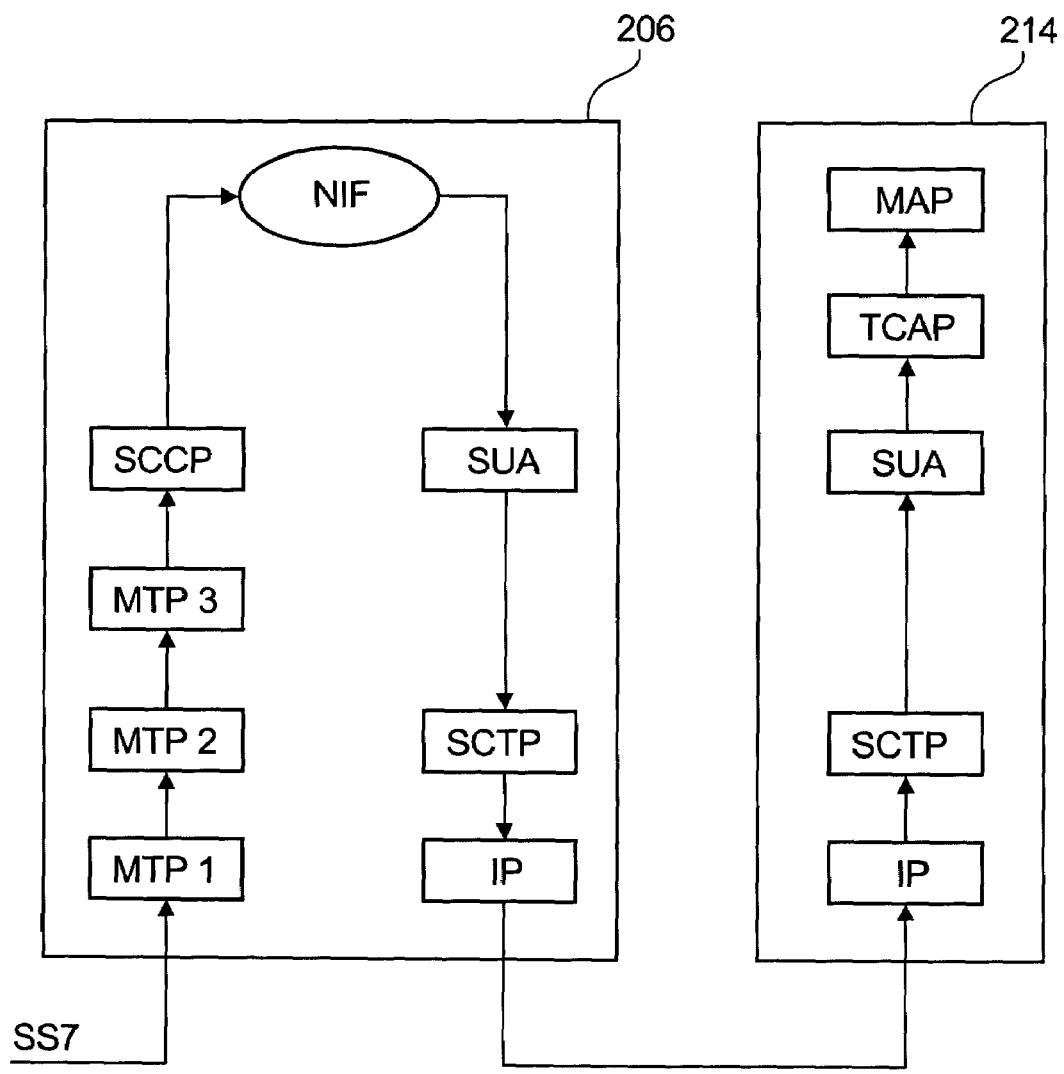
FIG. 3 shows an example of a protocol stack used at signaling gateway and at an access center in the GSM PLMN of FIG. 2.

FIG. 2 shows a schematic diagram representing a structure of a GSM PLMN according to a first embodiment of the invention. The PLMN 200 of FIG. 2 comprises a core network 202, which hereinafter will also be referred to as SS7-network. In an embodiment of the present invention there are a MSC 204, a signaling gateway (SG) 206, connected to the MSC 204, a HLR 208, and a VLR 210. The core network 202 is connected with access centers 214 and 216 through signaling gateway 206 and an IP network 212. Each access center 214, 216 has assigned access points 218 and 220, 222 respectively.

The access point of the preferred embodiment allows to use GSM terminal devices such as for instance mobile telephones, handheld computers, laptop computers or any other equipment adapted to communicate data according to the GSM standard without any modification. As such, the access point provides radio frequency (RF) coverage at frequencies according to the GSM standard. The use of the GSM standard has the advantage of its global proliferation. Due to the large number of GSM-compatible handsets sold, the cost for the end user is particularly low in this embodiment. GSM terminal devices 224 and 226 are located in a first network cell 228 covered by access point 218. A terminal device 230 is located in a second network cell 232 covered by access point 222.

Access points 218, 220, and 222 provide island-like radio coverage in their respective network cells 228, 232, and 234, which typically extend over a region of 1.5 to 3 kilometers radius around the respective access point. The architecture of FIG. 2 is particularly suitable for user numbers around 200 for each access point. 6000 users are typically covered by an access center of the network structure of FIG. 2.

In contrast to standard GSM PLMNs, access points 218 to 222 provide local switching functionality. In case terminal device 224 requests a call to terminal device 226, access point 218 will establish to local user-data channel sections 238 and 240. The first local user-data channel section 238 is established between terminal device 224 and access point 218. The second user-data channel section is established between access point 218 and terminal device 226. All user data will then be directly routed along the channel section 238 and 240 through access point 218. No user data is routed to the assigned access center 216 or the core network 202. This way, only call signaling need to transfer the IP network 212 for an exchange between the access point and the core network. The user data is switched locally, thus saving link cost between the access point and the core network.

For a call between two network cells 232 and 228 assigned to the same access center 216, all user data will be forwarded from the access points 218 and 220 to the access center 216. Access center 216 forwards the user data between assigned access points through the IP network. Dashed arrows 242 and 244 indicate the corresponding user-data path. In this embodiment, the user data is not switched in the core network, but in the access center 216. This way, link cost between the access center 216 and the core network is saved. Only call signaling will traverse the IP network be exchanged between access center 216 and core network 202.

For calls between a terminal device in a network cell 234 served by access point 222 and a terminal device in a different PLMN, the user data generated by terminal device 246 attached to access point 222 is directed through access point 222, access center 214, signaling gateway 206 and gateway MSC of core network 202 to the external PLMN.

To further reduce implementation cost, an asynchronous link between the access points and the access centers is used in one embodiment. An external clock is required on each access point to provide clocking information. The access points comprise a clock unit with a receiver, which is adapted to receive an external clock signal through a wireless channel. The clock unit is adapted to derive an internal clock signal from the received external clock signal and to provide the internal clock signal to the access-point. The clock unit comprises a global-positioning-system (GPS)-receiver. GPS receivers are mass products and allow providing clocking in the context of an asynchronous link at low cost.

Access centers and access points maintain respective access databases comprising subscription information of respective registered users, similar to subset home location registers (HLR).

In an embodiment of the network architecture of FIG. 2 an equipment identity register (EIR) or an authentication center, as used in traditional GSM networks, is not required. This is made possible by using a stateless seed value of the subscriber identity modules (SIM) of the terminal devices, as will be explained in more detail with reference to FIG. 4.

Even if the link between an access point or an access center is down, a user still can make calls to other users within the coverage of the same access point.

1.2 Signaling

Next, the signaling between the access point, the access center and the signaling gate way will be described in more detail. The signaling in the core network follows the SS7 protocol. The signaling system 7 (SS7) is a common-channel signaling system. This means that one channel is used only for sending the signaling information, whether the system has one bearer channel or multiple bearer channels.

From the point of view of the core network, each access center is treated as another SS7-adressable network node.

It is noted that in one embodiment of the invention the core network 202 does not support handover and corresponding signaling for terminal devices attached to access points 218, 220, and 222. Thus, a major subset of radio resource management and mobility management need not be implemented in the core network 202.

The omission of handover functionality does not represent an obstacle to the realization of the invention, since handover-as a functionality module is not a prerequisite to other functionalities provided by the access point of the invention.

The output of the core network towards each access center is standard SS7 signaling and 64 Kilobit per second (kBps) pulse-code-modulated voice signals as user data. Therefore, the architecture of the core network 202 is flexible in terms of a connection with other networks. The core network 202 also handles authentication, authorization and accounting as will be described in detail below with reference to FIGS. 4 to 9. Roaming is supported.

a) Protocol Stack

Next, the protocol stack used in communication between the signaling gateway 206 and the access center 214 will be described with reference to FIG. 3. In FIG. 3, signaling gateway 206 and access center 214 are represented by blocks 206 and 214, respectively. Inside the blocks, protocol layers are represented by small blocks. The signaling gateway 206 uses a protocol stack for communication with the rest of the SS7- or core network 202. The protocol stack comprises the message transfer part (MTP) levels 1 to 3, corresponding to the layers 1 to 3 of the OSI 7 layer reference model. MTP1 provides the physical layer. MTP2 is a signaling link, which together with MTP3 provides reliable transfer of signaling messages between two directly connected signaling nodes of the core network. MTP3 ensures reliable transfer of the signaling messages, even in the case of the failure of the signaling links or signaling transfer points. MTP3 includes appropriate functions and procedures necessary both to inform other nodes of the core network of the consequences of a fault, and to appropriately reconfigure the routing of messages through the core network.

On top of MTP3, the signaling gateway 206 runs the signaling connection control part (SCCP). SCCP offers enhancements to MTP3 to provide a connectionless and connection-oriented network services, as well as to provide address translation capabilities. SCCP enhancements to MTP3 provide a network service, which is equivalent to the layer 3 of the OSI reference model.

A nodal inter-working function (NIF) runs on top of the SCCP layer, connecting the SS7 side of signaling gateway 206 to the access center side.

The protocol stack on the access-center side of signaling gateway 206 will be described next. The protocol stack will be described in reversed order in comparison to the SS7-side of the signaling gateway. The signaling gateway 206 runs a SCCP user adaptation layer (SUA), which emulates the SCCP protocol. It provides a means, by which an Internet protocol access center may be reached by signaling gateway 206. Multiple access centers can be reached. The SUA runs on top of a Stream control transmission protocol (SCTP) transport protocol layer. SCTP is a transport protocol, which is designed especially for the transport of time-sensitive signaling data. SCTP does corresponds to the layer 4 of the OSI reference model. Layer 3 on the access center side of signaling gateway 206 is covered by standard IP.

The protocol stack of access center 214 and 216 corresponds to that used by the signaling gateway 206. In addition, access centers run the transaction capabilities application part (TCAP) protocol on top of the SUA. On top of TCAP, the access center runs the Mobile Application Part (MAP).

In the following, message flow diagrams representing the implementation of different procedures in the network structure of FIG. 2 will be set forth with reference to FIGS. 4 to 9.

b) Service Enrolment

Figure 4:
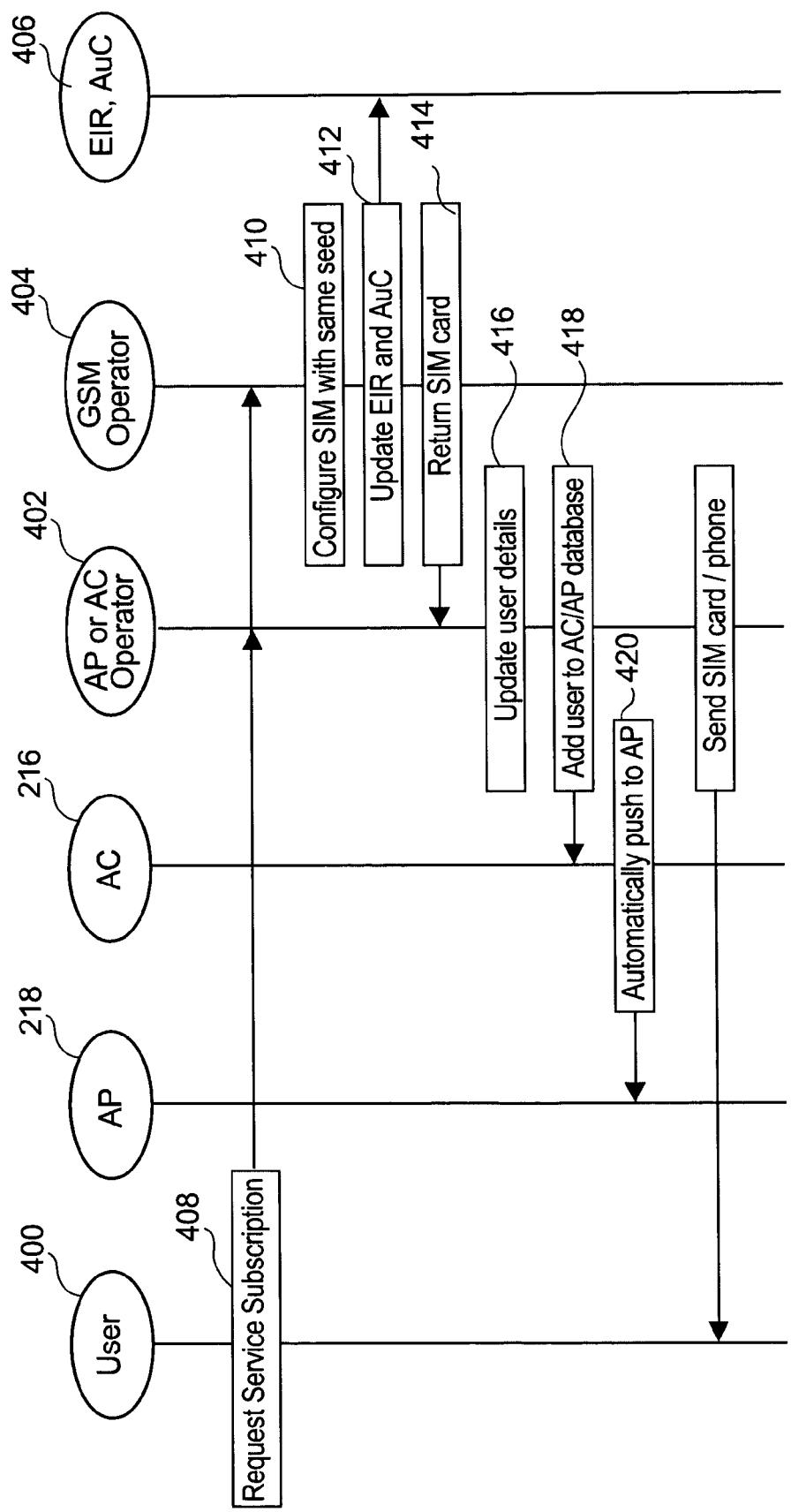
FIG. 4 shows a flow diagram representing the message flow of an enrolment procedure for a terminal device in a network cell of a RAN of a GSM PLMN according to the first embodiment of the invention.

FIG. 4 shows a flow diagram representing the message flow of an enrolment procedure for a terminal device in a network cell of a RAN of a GSM PLMN according to the first embodiment of the invention.

The enrolment procedure shown in FIG. 4 enables a user 400 to join and activate a wireless telecommunication service in the GSM PLMN of FIG. 2. For illustration purposes it is assumed that the user 400 lives in a village, which is covered by network cell 228. The user directs his request to an operator 402 of access point 218 or access center 216. The operator 402 of access point 218 or access center 216 forwards the request to a GSM operator 404, who operates core network 102. Alternatively, user 400 may directly request service subscription from GSM operator 404. GSM operator 404 prepares a SIM (subscriber identification module) card for user 400 (step 410).

According to an embodiment of the invention, in preparing a SIM card for user 400, the GSM operator uses a single seed value, which is assigned to all users in the coverage of access controller 216. The seed value can be pre-programmed or pre-configured at each access point and access controller. Alternatively, the seed value can be chosen identical to the international mobile subscriber identity (IMSI) of user 400. In this case, access points and access controllers are stateless. No security configuration is required at the access points or access centers.

After configuration of the SIM card for user 400, the GSM operator 404 updates the equipment identity register EIR and the authentication center and other well-known data bases of the GSM network in step 412. The SIM card is sent to the AP or AC operator 402 in step 414. AP or AC operator 402 updates his access data base that contains data like the identification of access center 216, identification of access point 218, IMSI number of user 400, telephone number assigned to user 400, and other useful information (step 418). Access center 216 automatically pushes the new data to access point 218 using a signaling message (step 420). Should for some reason the link between access center 216 and access point 218 be down or should access point 218 be down, the access center operator will inform access point operator to add information manually. To complete the enrolment procedure to wireless telecommunication services, access point or access center operator 402 sends the configured SIM card alone or along with a terminal device, e.g., a mobile phone containing the configured SIM card to user 400.

For the purposes of illustration, it is assumed that the seed value stored in the SIM card of user 400 is identical to the IMSI value.

c) Authentication in Home Network Cell

Figure 5:
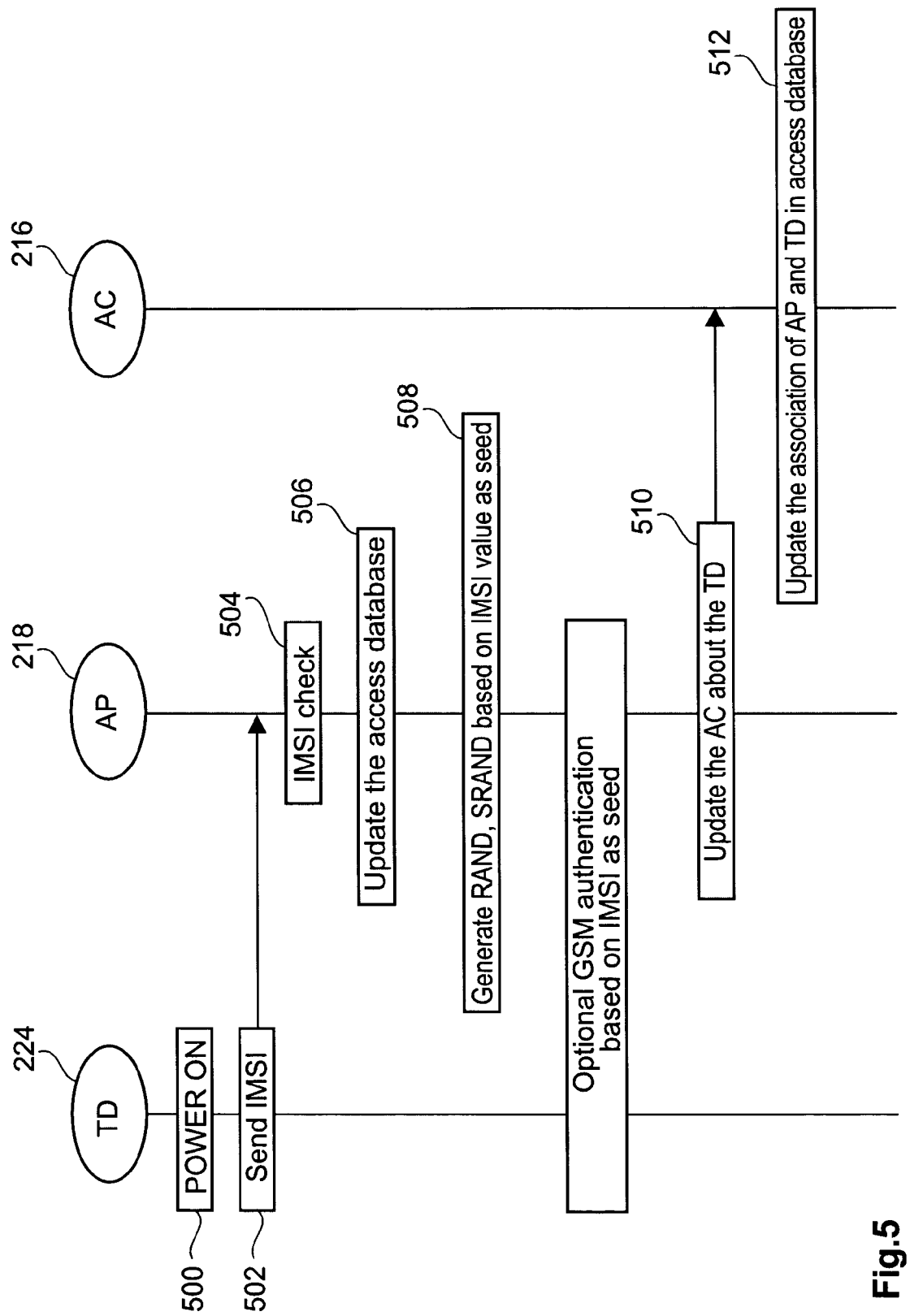
FIG. 5 shows a flow diagram representing the message flow during an authentication procedure for a terminal device in a network cell of a RAN of a GSM PLMN according to the first embodiment of the invention.

FIG. 5 shows a flow diagram representing the message flow during an authentication procedure for a terminal device in a network cell of a PLMN according to embodiment of FIG. 2.

Two modes of authentication are provided, namely, access authentication and an optional GSM authentication. According to the invention, the access authentication procedure is performed between a terminal device and an access point only. The optional GSM authentication further involves the access center. This will be explained in the following with reference to FIG. 5.

After turning on terminal device 224 at step 500, terminal device 224 sends the IMSI number stored on its SIM card to access point 218 (step 502). Access point 218 performance an INSI check at step 504. In order to perform an IMSI check, access point 218 parses the layer-3-signaling received from terminal device 224 in order to extract the IMSI value contained therein. Then it compares the received IMSI value against the values stored in its access database. If the received IMSI is contained in the access database, the terminal device 224 is recognized as belonging to a home user, i.e., a user registered with access point 218. In step 506 access point 218 updates its access database.

At step 508, access point 218 generates a random number RAND and seed SRAND for the random number generation, using the received IMSI value as a seed value.

Optionally, access point 218 informs access center 216 about the presence of terminal device 214 (step 510). In that case, access center 216 updates its database with the association of access point 218 and terminal device 224 (step 512).

Since the GSM authentication seed is the same as the IMSI, access point 218 generates an authentication vector based on the IMSI itself and completes the GSM authentication with terminal device 224. If a location update message is received, the access point 218 generates a temporary mobile subscriber identity (TMSI) value, which is identical to the IMSI value. Since the user of terminal device 224 is allowed to roam within the coverage of access center 216, there is no need to generate a separate TMSI value.

According to the present authentication procedure, the initial IMSI check is used as an access authentication. The traditional GSM authentication procedure can be performed optionally at the access point. While the described authentication procedure is weak against attacks, it takes into consideration that an implementation of the authentication procedure is particularly suitable in remote areas like villages, where the computing facility to attack a mobile network is usually not available.

The described authentication procedure has the advantages of limiting the message exchange between an access point and access center and of making the PLMN network of FIG. 2 compatible with existing GSM networks. In addition, a forward compatibility is provided for networks based on WLAN (wireless local area network) standards. In addition, the network management cost is reduced. Access point and access centers are provided with intelligence to recognize users and process calls. This allows to combine the network structure of FIG. 2 with other networks like public switch telephone networks (PSTN) etc.

d) Authentication for Roaming Users

Figure 6:
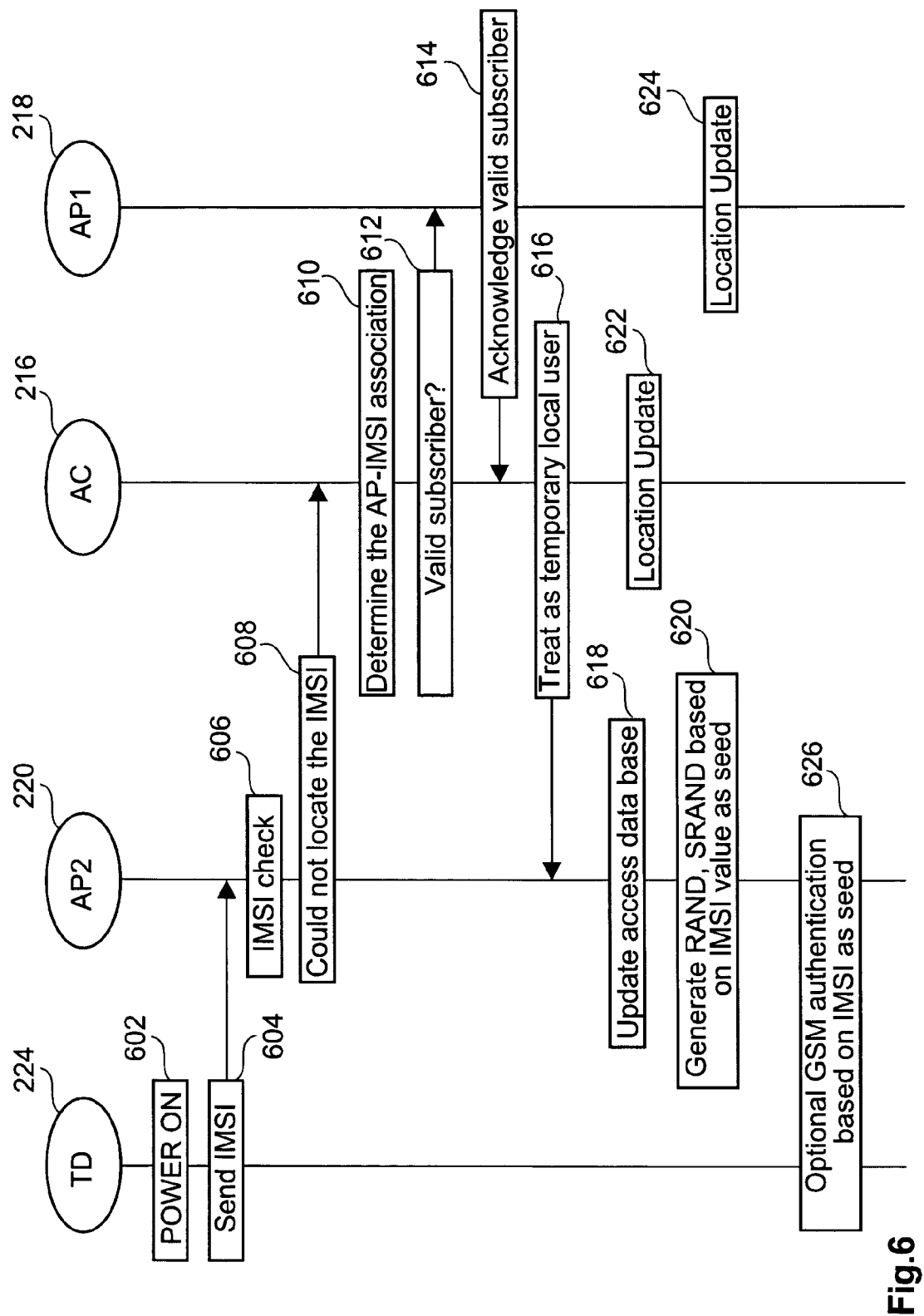
FIG. 6 shows a flow diagram representing the message flow during an authentication procedure for a terminal device roaming in a foreign network cell of a RAN of a GSM PLMN according to the first embodiment of the invention within the coverage of the same access controller.

FIG. 6 shows a flow diagram representing the message flow during an authentication procedure for a terminal device roaming in a foreign network cell of a RAN of a GSM PLMN according to the first embodiment of the invention within the coverage of the same access controller.

For the purpose of the following description it is assumed that the user of terminal device 224 is roaming in network cell 232 covered by access point 220. Visited network cell 232 and home network cell 228 of terminal device 224 are both connected to access center 216.

After terminal device 224 has been turned on (step 602), access point 220 performs an IMSI check as described above with reference to FIG. 5 (steps 604, 606). Since terminal device 224 is roaming, access point 220 will not find the IMSI value of the subscribed user of terminal device 224 in its access database. In this situation, access point 220 forwards that IMSI to access center 216 (step 608). Access center 216 then checks its access database. Since the user of terminal device 224 is registered with access point 218, access center 216 will find the association between terminal device 224 and access point 218 (step 610). Access center 216 sends a query to access point 218 to ascertain whether terminal device 224 belongs to a valid user still subscribed to service. Also, the query may serve to get information on whether the user is in arrears with payment (step 612).

For the purposes of the following description it is assumed that the subscriber is valid. Access point 218 returns a corresponding message to access center 216 (step 614), which then informs the visited access point 220 to treat terminal 224 as a temporary local user roaming in network cell 232 (step 616).

Access point 220 updates its access database and performs the authentication procedure in a similar way as described with reference to FIG. 5. It updates its access data base (step 618) and generates RAND and SRAND values based on the IMSI value of the subscribed user of terminal device 224 as a seed value (step 620). Meanwhile, access center 216 and access point 218 update the temporary association of terminal device 224 to access point 220 in their respective data bases (steps 622, 624).

Optionally, a GSM authentication procedure is performed based on the IMSI value of the user of terminal device 224 as a seed value at step 626 between terminal device 224 and access point 220.

In case a terminal device not registered with any of the access points of PLMN 200 is turned on in the coverage of PLMN 200, the IMSI of such a "normal" GSM terminal device will not be recognized by access points and access centers. In this situation, the access center will forward the IMSI to GSM network 202. Then, the well-known GSM authentication procedure is performed. For such a visiting terminal device, the respective access point and access center will perform functionality of a base transceiver station (BTS) and base station controller (BSC), as known in the art.

e) Service Deactivation

Figure 7:
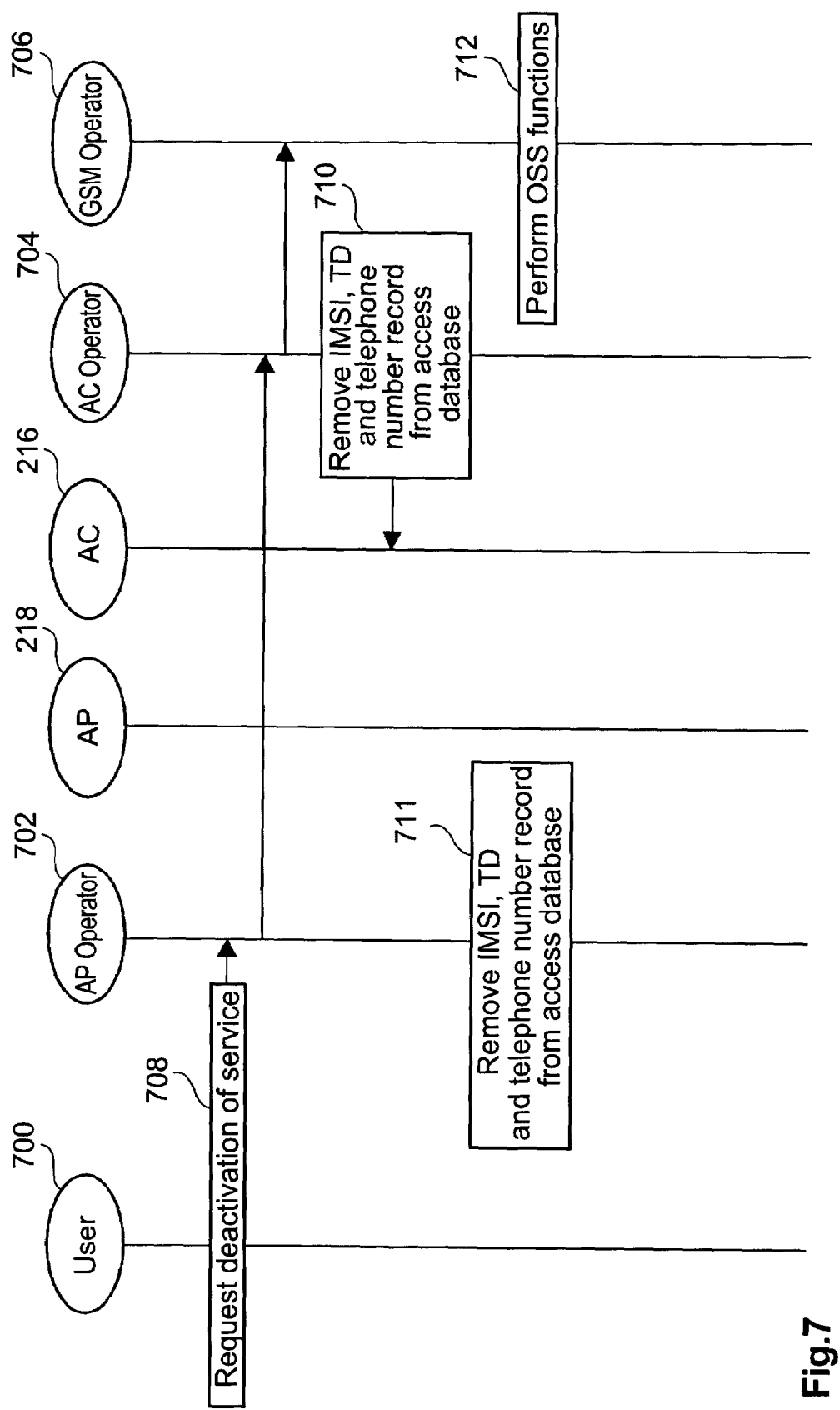
FIG. 7 shows a flow diagram representing the message flow during deactivation of services for a terminal device in a network cell according to the first embodiment of the invention.

FIG. 7 shows a flow diagram representing the message flow during deactivation of services for a terminal device in a network cell according to the embodiment of FIG. 2.

The process of deactivating service is basically reverse to that of service enrollment, which was described above with reference to FIG. 4. A user 700 wishing to cancel the wireless telecommunication service requests deactivation from his access point operator 702 (step 708). The access point operator 702 forwards the request to an access center operator 704, which in turn forwards it to a GSM operator 706 (step 710). Access center operator 704 removes the IMSI, TD, and the telephone number record for this specific user from the access database of access center 216 (step 710). Access point operator 702 removes the IMSI, TD, and the telephone number record for this specific user from the access database of access point 218 (step 711). GSM operator 706 performs operational-support-system (OSS) functions (step 712). The workflows performed are known in the art.

Next, different location update procedures for terminal devices registered with an access point of the invention will be explained.

f) Location Update in Home Network Cell

Figure 8:
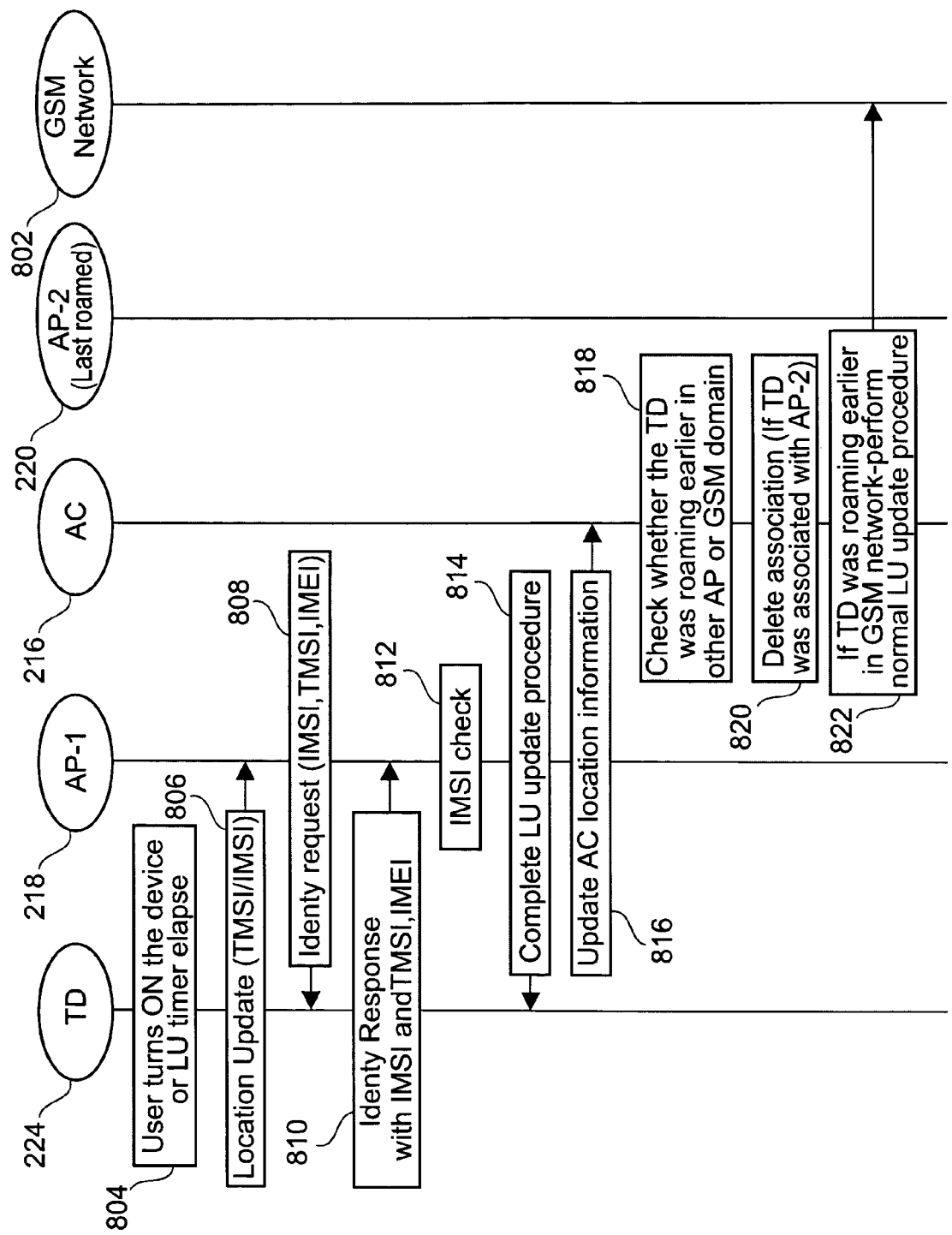
FIG. 8 shows a flow diagram representing the message flow during a location update procedure for a terminal device located in its home network cell of a RAN of a GSM PLMN according to the first embodiment of the invention after roaming in a second network cell.

FIG. 8 shows a flow diagram representing the message flow during a location update procedure for a terminal device registered in a network cell of a RAN of a GSM PLMN according to the embodiment of FIG. 2.

For the purpose of the following description it is assumed that terminal device 224 was earlier roaming in the network cell 232 covered by access point 220. As an alternative, the situation where terminal device 224 was earlier roaming in a GSM network 802 will be discussed further below.

A location update (LU) is initiated when a user turns on terminal device 224 or a LU timer has elapsed (step 804). The terminal device requests a LU by sending a LU request message to access point 218 (step 806). The transmitted message will also be referred to as LOC_UPD_REQ message.

In the following, details of the involved signaling will be described, which are not shown in the flow diagram. For transmitting the LOC_UPD_REQ message, terminal device 224 requests a control channel from access point 218 in a channel-request message. In one embodiment, it is already the channel-request message, which indicates a LU request. In response to the LU request, access point 218 decides, which channel (type and number) to use and activates a channel. Access point 218 sends this channel information over an access grant channel (AGCH) to terminal device 224. Terminal device 224 then sends a SABM to activate the layer-2 LAPDm (Link Access Procedure D mobile) connection. The SABM contains the LOC_UPD_REQ data. Access point 218 confirms that a LAPDm connection is established by sending an UA (Unnumbered Acknowledge) message, which repeats the LOC_UPD_REQ.

Access point 218 checks the IMSI value received from terminal device 224 (step 812). If the access point finds the IMSI value in its own database, it will complete the LU procedure by informing terminal device 224 in a corresponding message (step 814).

In order to release the control channel, access point 218 sends a channel-release message to terminal device 224. Terminal device 224 responds by sending a disconnect-message to release the layer-2 connection. Access point 218 confirms release of the layer-2 connection by sending an UA message.

Access point 218 will then inform access center 216 about the current location information for terminal device 224 (step 816), if the link between access point 218 and access center 216 is available. Access center 216 realizes by reading the IMSI received from terminal device 224 that it belongs to a registered local user. Access center 216 checks whether terminal device 224 was roaming before in a network cell of another access point or in a GSM domain. Assuming that terminal device 224 was roaming before in network cell 232 of access point 220, access center 216 will inform access point 220 to delete the association of terminal device 224 with this access point.

It is noted that also a periodic update will be performed so that the effect of temporary unavailability of the link between access point 218 and access center 216 can be alleviated.

Access center 216 then performs a location update with the core network over an IP connection. The MCS/VLR of the core network assigns a TMSI. A TMSI reallocation command is sent to access center 216 and then forwarded to intercepted by access point 218. Access point 218 confirms with a TMSI reallocation complete-message on behalf of the mobile station.

The core network releases the control channel between access center 216 and the core network after the LU. Access point 218 again intercepts the message and replies on behalf of terminal device 224 to complete the channel release.

Assuming that terminal device 224 was earlier roaming in a standard GSM network, access center 216 will perform a location update procedure known from the GSM standard.

It is noted that even though the access point generates the TMSI value as identical to the IMSI value, an access point cannot determine the identity of a terminal device based on the TMSI value transmitted in response to a LOC_UPD_REQ message. Therefore, an access point requests the IMSI value and then determines, based on this value, whether the user is registered to the same access point or is roaming from another access point or from a standard GSM network. The reason for proceeding this way is that a mobile switching center (MSC) will generate a TMSI value according to standard GSM procedures and different from the IMSI value, when a terminal device registered with an access point of the invention has roamed to a GSM network. Therefore, in the domain of an access center of the network structure of the invention location updates are performed based on the IMSI value.

g) Location Update for Roaming Users

Figure 9:
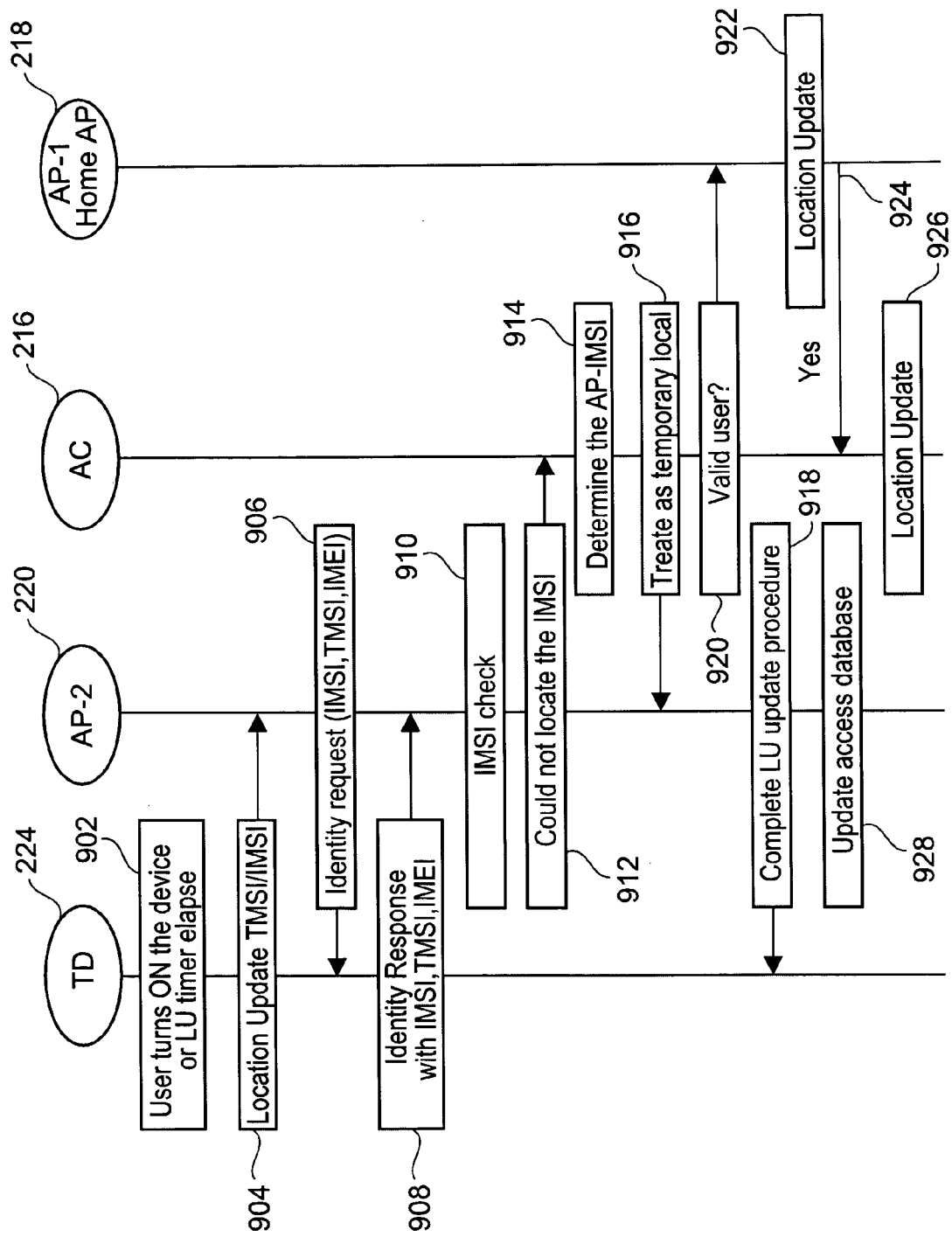
FIG. 9 shows a flow diagram representing the message flow during a location update procedure for a terminal device registered in a network cell of a RAN of a GSM PLMN according to the first embodiment of the invention when roaming in a foreign network cell assigned to the same access-center node.

FIG. 9 shows a flow diagram representing the message flow during a location update procedure for a terminal device registered in a network cell of a RAN of a GSM PLMN according to the first embodiment of the invention when roaming in a second network cell assigned to the same access-center node. For the purpose of the following description it is assumed that terminal device 224 is roaming in network cell 232 of access point 220.

At step 902, the user turns on the terminal device 224 or a LU timer has elapsed to initiate a periodical LU update. Terminal device 224 requests the location update (step 904) from access point 220. Access point 220 responds by sending an identity request message (step 906). In one embodiment, the IMSI is included in a LOC_UPD_REQ message. In this embodiment, the access point 220 will not generate the identity request of step 906. Access point 220 will instead extract the IMSI values from the LOC_UPD_REQ message itself.

The establishment of the radio resource (RR) connection and of the LAPDm connection between terminal device 224 and access point 220 corresponds to that described earlier for the case of connection with the home access point 218 in the context of FIG. 8.

Access point 220 performs an IMSI check with its local access data base (step 910). Since terminal device 224 is not registered with access point 220, it is not able to locate the IMSI of the subscribed user of terminal device 224 in its access database. This information is transferred from access point 220 to access center 216 (step 912). Access center 216 then checks its access database for an association of the IMSI of the user of number of terminal device 224 with another access point in the coverage of access center 216.

Access center 216 then determines that terminal device 224 is registered with access point 218 (step 914). It informs the visited access point 220 to treat the IMSI value received from terminal device 224 as a temporary local value (step 916). Access point 220 in turn signals to terminal device 224 that the location update procedure is complete (step 918).

Access center 216 further requests from home access point 218 whether the IMSI received from terminal device 224 belongs to a valid user (step 920). For the purpose of the present description it is assumed that this is the case. Home access point 218 notes the location update for terminal device 224 in its access data base and signals to access center 216 that the user is valid (steps 922 and 924). Access center 216 then notes the location update in its own database as well (step 926).

With step 928, the visited access point 220 has updated its access database.

An optional GSM authentication may be performed depending on the configuration of the access points. The GSM authentication serves to assign a TMSI value to terminal device 224. The corresponding procedure was described earlier in the context of the location update performed with the home access point 218 (FIG. 8).

The temporary association of terminal device 224 with access point 220 is in one embodiment only kept in local databases of the access center and home and visitors access points. This allows to route calls appropriately. There is no location update procedure in this embodiment towards a GSM network if the terminal device 224 is roaming within the domain of an access center or a set of access centers according to the present invention. Furthermore, if the periodic LU time interval has not elapsed, the LU update is not conveyed to the GSM network. This helps to route calls to the user of terminal device 224.

When a user of terminal device 224 turns on the device in a normal GSM network, the device will generate the LU procedure with the visited network. Based on the TMSI/IMSI value, the LU request will be forwarded to the GSM network. The MSC performs subscription validation with the HLR, and depending upon the subscriber a LU-accept or LU-reject message will be generated towards the terminal device.

Standard GSM terminal devices roaming in a network cell of an access point of the invention will be treated as normal GSM users.

In a preferred embodiment access-center and access point performed periodic checks whether the link between them is functioning. Access-center 216 and access point 220 work independently, irrespective of the availability of a communication link between each other. Thus, situations may occur, in which for some reason the link between access point 218 and access-center 216 is down, or access-center 216 is not functioning. In this situation, during authentication, access point 218 performs the authentication procedure of FIG. 8 for a home user and the authentication procedure of FIG. 9 for a roaming costumer. A roaming user assigned to a foreign access-center will not receive any service at this time. A roaming user from another point assigned to access-center 216 will be allowed to make intra-access-point calls only. Calls to the outside of the current network cell will be denied, as there is no connectivity between access point and access-center. Access point 218 will generate an appropriate error message for display at terminal device 224.

h) Delayed Location Update and Authentication

After the link between access-center 216 and access point 218 becomes available again, both network nodes perform a delayed authentication procedure for all terminal devices. Access-center 216 will poll each subordinate access point and request a list of the currently active users by a message GET_ACTIVE_USERS.

The access points will then respond by sending their respective list of active users, both local and visiting users, to access-center 216 in a message ACTIVE_USER LIST. Access-center 216 will then update its internal access database. It may also check the subscription service plan of the particular user (cf. section 5. below). Access-center 216 will then perform a delayed location update towards the GSM call network and complete the authentication on behalf of the respective terminal devices. After successful completion of the authentication and location update, access-center 216 will send a response to each subordinate access point. This can be performed either in one message containing all successful authentications or location updates. Alternatively, separate messages can be sent for each terminal device or for each authentication and each location update.

i) Intra-Network-Cell Call Establishment and Release

Figure 10:
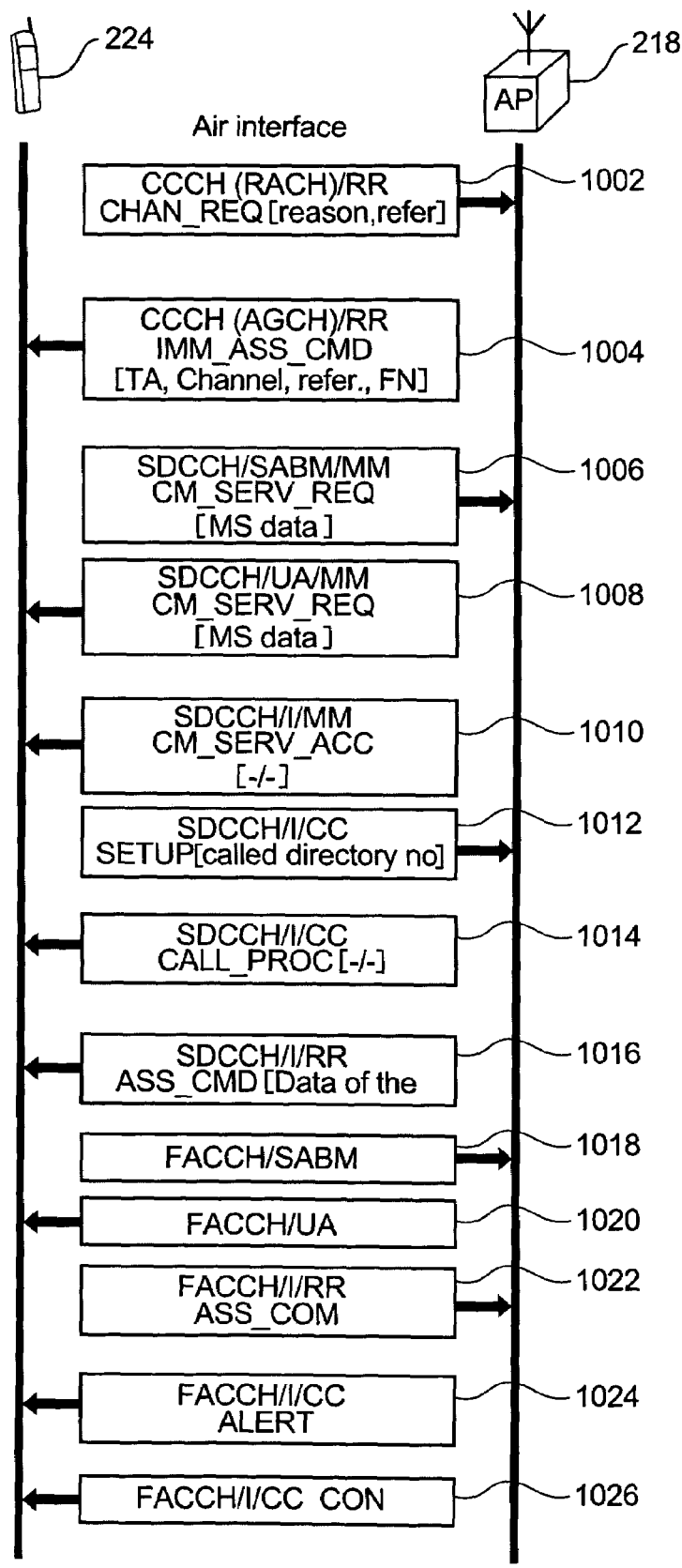
FIG. 10 represents a flow diagram representing the message flow during a call between two terminal devices in a network cell according to the first embodiment of the invention.
Figure 10:
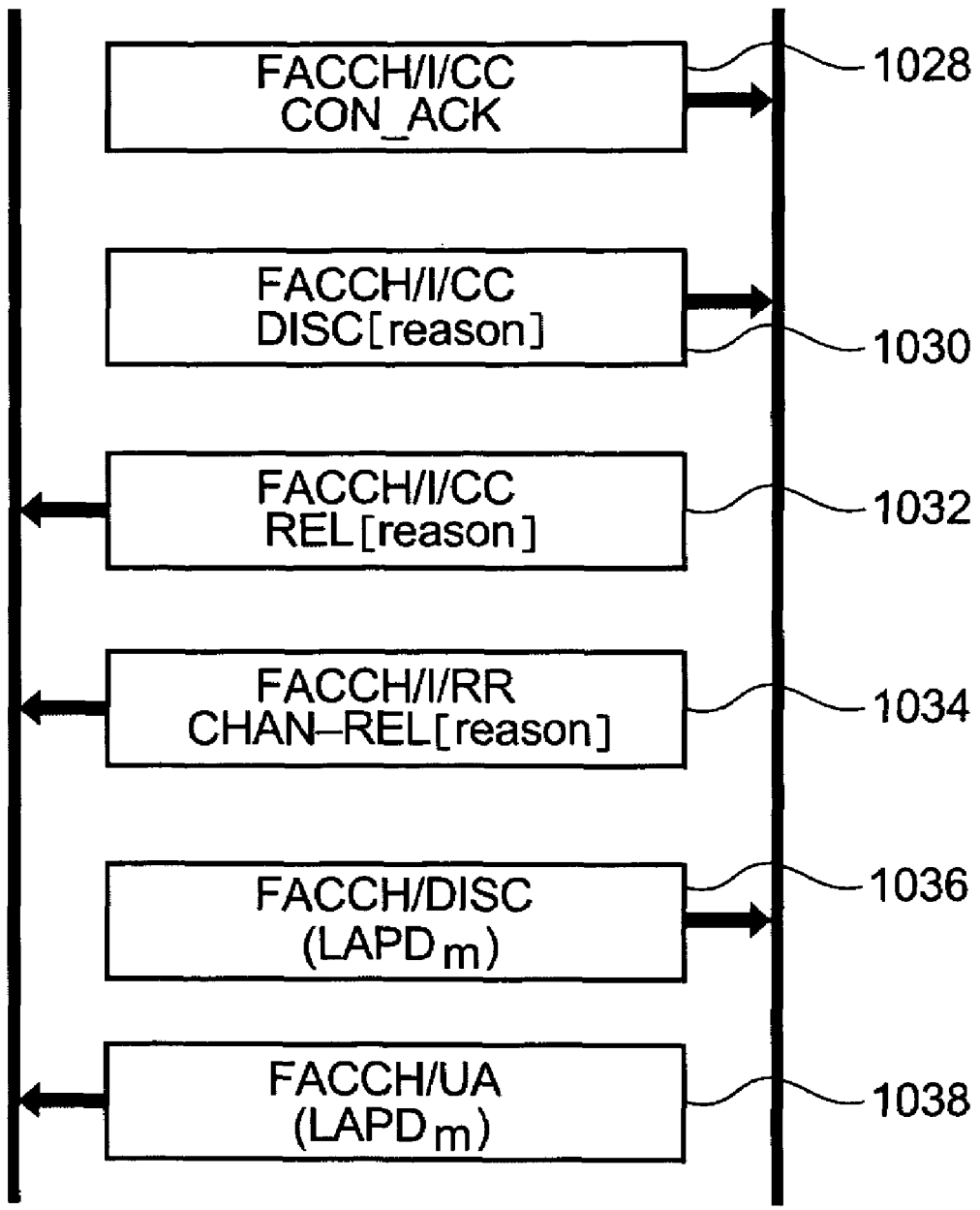

FIG. 10 represents a flow diagram representing the message flow during a call between two terminal devices located in a network cell according to the first embodiment of the invention. For the purposes of the present example it will be assumed that the call originates at terminal device 224 and is directed to terminal device 226. Both terminal devices are assumed to be in the coverage of access point 218, which is further assumed to be their home access point. Furthermore, in the following description, only the messages exchanged between terminal device 224 and access point 218 is explained. The signaling related to a mobile-terminated call will be set forth with reference to FIG. 13 below.

Terminal device 224 and access point 218 are connected through an air interface. For placing a call, terminal device 224 first initiates the establishment of a Radio Resource (RR) connection to access point 218. At step 1002, terminal device 224 sends a RR channel request (CHAN_REQ) message to access point 218 on a random access channel (RACH). The random access channel can be used without any coordination between terminal devices. If two terminal devices use the channel at the same time, their messages will be lost in a collision. The terminal devices will detect the collision via a time out and retransmit the channel request after a random delay. The random access channel forms a common control channel (CCCH).

Access point 218 responds to the RR channel request by sending an Immediate Assignment Command (IMM_ASS_CMD) on an access grant channel (AGCH), which also forms a CCCH. Terminal device 224 listens to the AGCH until the IMM_ASS_CMD is received. This message assigns a specific frequency and a time slot on that frequency for communication with the network. The message contains also time and frequency corrections. The time corrections allow the mobile to time its transmission so that they reach the access point only in the specified time slot. The frequency corrections correct for a Doppler shift caused by a motion of the terminal device. After tuning to the assigned channel, terminal device 224 sends a Set Asynchronous Balanced Mode (SABM) message to access point 218 in order to initiate a mobility management (MM) connection. It also sends a Connection Management service Request (CM_SERV_REQ) (step 1006). The CM_SERVE_REQ data contain the IMSI identifying the subscriber of terminal device 224. The messages are sent using a stand-alone dedicated control channel (SDCCH). On the same channel, access point 218 responds at step 1008 with an unnumbered acknowledge (UA) to the CM_SERV_REQ message. This completes the LAPDm setup handshake. The CM_SERV_REQ is saved at access point 218 in case the call destination is outside network cell 228.

At step 1010 access point 218 compares the caller's IMSI with its local access database. Since terminal device 224 is permanently registered with access point 218, access point 218 will find a match. It confirms the service request with a CM_SERV_ACC message. The message is sent on the SDCCH.

Terminal device 224 responds by sending a SETUP message on the SDCCH to access point 218. The SETUP message contains the destination number of terminal device 226 (step 1012).

Access point 218 intercepts the SETUP message and identifies that the destination number is associated with the same network cell. Access point 218 confirms with a Call-Proceeding message (CALL_PROC), at step 1014.

Access point 218 will then decide, which physical channel is to be used. For this purpose, access point 218 observes the physical situation on the air interface. With an Assignment Command (ASS_CMD) access point 218 communicates the traffic channel (TCH) for user data to terminal device 224, using the SDCCH.

Terminal device 224 sends a SABM using a fast associated control channel (FACCH) at step 1018. At step 1020, access point 218 returns a UA on the same control channel.

At step 1022, terminal device 224 sends an Assignment Complete message to access point 218, using the FACCH. Access point 218 informs terminal device 224 that the called terminal device 226 is being alerted, using the FACCH. Terminal device 224 generates a ring ton in its speaker, once its receives this Alert message.

After access point 218 receives an Answer message (ANS) from the called terminal device 226, it sends a Connect message (CON) to terminal device 224. The exchange of user data like voice traffic begins when terminal device 224 receives the CON message. Terminal device 224 acknowledges the connect message with a connect acknowledge (CON_ACK) message at step 1028.

Then, user data are exchanged between the connected terminal devices 224 and 226 until one of the users of the terminal devices decides to end the call.

It is assumed that the user of terminal device 224 ends the call. This is initiated by sending a Disconnect (DISC) message via the FACCH to access point 218 (step 1030). Access point 218 responds by sending a Release (REL) command via the FACCH (step 1032). With steps 1034 to 1038 the radio resource connection and the LAPDm connection on layer 2 are released.

j) Inter-Network-Cell Call Establishment and Release

Figure 11:
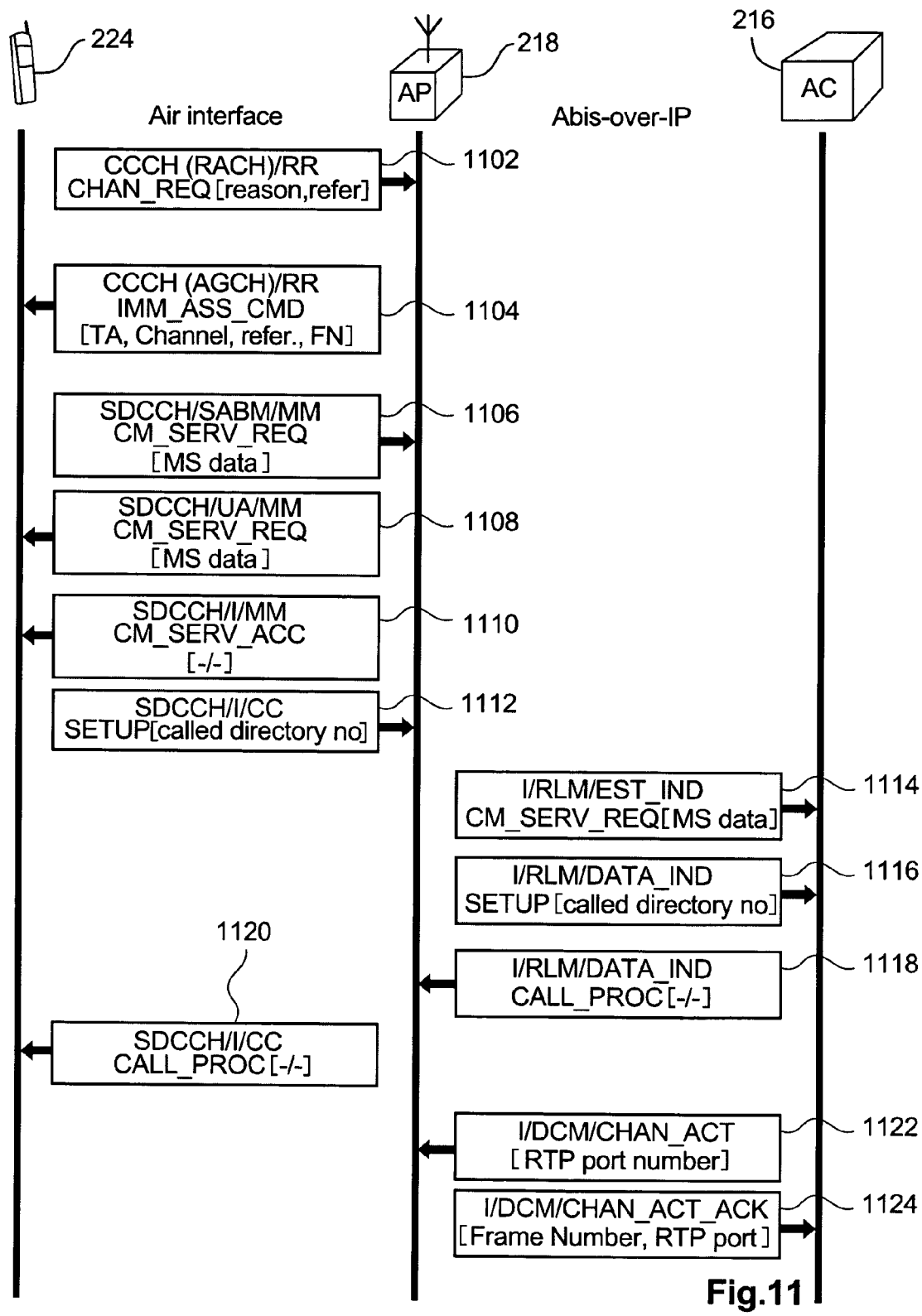
FIG. 11 shows a flow diagram representing the message flow during a call originating at a terminal device in a first network cell and terminating at a terminal device in a second network cell, wherein both network cells are assigned to the same access center.
Figure 11:
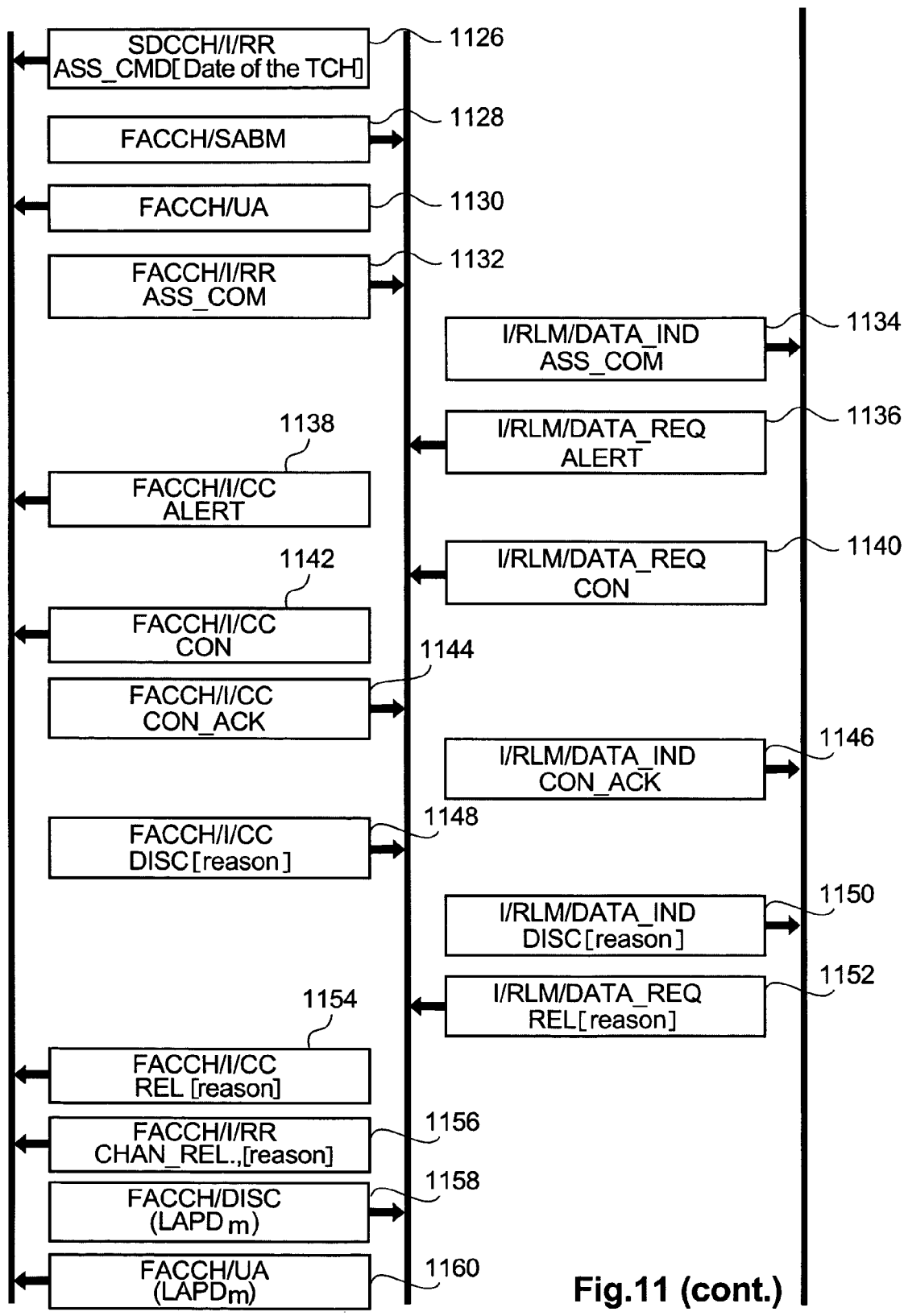

FIG. 11 shows a flow diagram representing the message flow during a call originating at a terminal device in a first network cell and terminating at a terminal device in a second network cell, wherein both network cells are assigned to the same access center.

For the purpose of the following description, it is assumed that the call is initiated by terminal device 224 in network cell 228 served by access point 218, and is directed to terminal device 230 in network cell 232 served by access point 220. Both access points 218 and 220 are assigned to the same superordinate access center 216. Furthermore, in the following description, only the messages exchanged between terminal device 224, access point 218 and access center 216 are shown. The signaling related to a mobile-terminated call will be explained with reference to FIG. 13 below Terminal device 224 and access point 218 are connected through an air interface, and access point 218 and access center are connected over an Abis-over-IP interface. The message flow for establishing a RR and MM connection in steps 1102 to 1112 corresponds to that of an intra-network-cell call as described with reference to FIG. 10, steps 1002 to 1010. The following description concentrates on the differences in the call control, which are due to the fact that the called terminal device 226 is not within the coverage of access point 218.

After receiving a SETUP message containing a data indicator DATA_IND message from terminal device 224, access point 218 finds by checking with its access database, that the destination number of the call request is not allocated to a terminal device located in the coverage of access point 218. Therefore, at step 1114 and 1116, access point 218 forwards both, the SETUP and the CM_SERV_REQ message containing an establishment indicator EST_IND. Both messages where originally received from terminal device 224. Access center 216 finds a match of the destination number in its regional access database and responds to access point 218 with a CALL_PROC message.

The message exchange between steps 1114 and 1118 is performed in the framework of a real-time transfer protocol (RTP) location management (RLM). RTP is well known in the art.

Access point 218 forwards the CALL_PROC message to terminal device 224 using the SDCCH (step 1120). In the following, access center 216 instructs access point 218 to setup traffic channels, using a CHAN_ACT message containing a Real-time Transport Protocol (RTP) port number (step 1122). The inclusion of the RTP port number is a modification over existing message formats for the CHAN_ACT message in the GSM standard. The access point 218 acknowledges the instruction by returning a CHAN_ACT_ACK message at step 1124, which includes the source RTP port number.

At step 1126 access point 218 then decides, which physical channel to use, again observing the physical situation on the air interface. With an ASS_CMD command, access point 218 communicates the traffic channel to terminal device 224, using the SDCCH. Steps 1128 to 1130 correspond to steps 1018 to 1022 in the setup of the traffic channel.

Access center 216 confirms by checking in its access database that the destination terminal device 226 has updated its location. It then sends a paging request, which will be responded by terminal device 226 with a paging response. This will be described in more detail with reference to FIG. 13.

The ASS_COM message received from terminal device 224 is forwarded from access point 218 to access center 216 at step 1134. Access center 216 then generates an ALERT message and sends it to access point 218 (step 1136), which forwards it to terminal device 224 (step 1138), which in turn generates a ring tone.

After access center 216 has received an ANS message from the called terminal device 226, it sends a CON message to access point 218 (step 1140), which forwards the message to terminal device 224 (step 1142). The exchange of user data begins when terminal device 224 receives the CON message. Terminal device 224 acknowledges reception of the CON message with a CON_ACK message through the FACCH (step 1144). The Connection Acknowledge is forwarded to access center 216 at step 1146.

For the purpose of the present example it is assumed that disconnection of the call is initiated by terminal device 224. Terminal 224 thus sends a DISC message through the FACCH to access point 218 (step 1148). Access point 218 forwards the DISC message to access center 216 (step 1150).

Access center 216 response to access point 218 with a release message (REL) at step 1152. The message is forwarded to terminal device 224 (step 1154). After releasing the traffic channel, also the LAPDm connection is released with steps 1156 to 1160.

k) Establishment and Release of a Call to a Foreign Network

Figure 12:
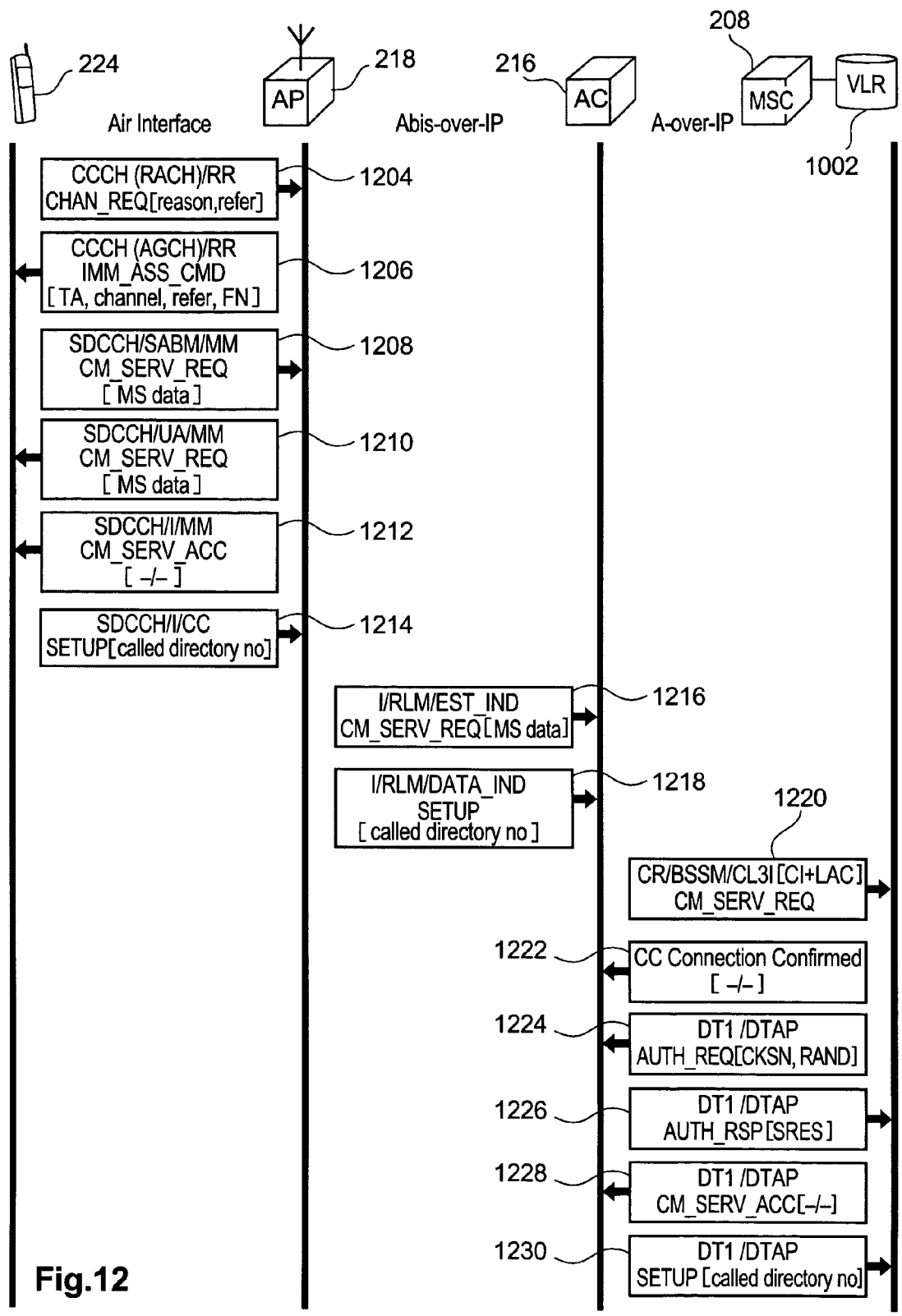
FIG. 12 shows a flow diagram representing the message flow during a call originating at a terminal device located in a network cell of a RAN of a GSM PLMN according to the invention and terminating at a foreign network cell of the PLMN, which is neither under control of the assigned access point nor of the assigned access center.

FIG. 12 shows a flow diagram representing the message flow during a call originating at a terminal device located in a network cell of a RAN of a GSM PLMN according to the invention and terminating at a foreign network cell of the PLMN, which is neither under control of the assigned access point nor of the assigned access center. For the purpose of the following description, it is assumed that terminal device 224 places a call to terminal device 246 located in network cell 234 served by access point 222. However, the scenario described here can be applied also to a call to any terminal device in a foreign network.

Again, signaling between the called party and the network is not shown here. For terminal devices in prior-art networks, this signaling is well known in the art. For terminal devices served by an access point according to the invention, the signaling will be explained with reference to FIG. 13.

The initial steps of establishing a RR connection and a MM connection between terminal device 224 and access point 218 from step 1204 to step 1212 correspond to those described with reference to steps 1002 to 1010 of FIG. 10. Forwarding of the SETUP and CM_SERV_REQ messages at steps 1214 to 1218 corresponds to steps 1112 and 1116 of FIG. 11. Since terminal device 246 is not registered with access center 216, access center 216 will not find a match of the destination number of the call request in its database and thus forward the CM_SERV_REQ message to MSC 208 at step 1220.

MSC 208 answers with a Connection-Confirmed (CC) message to establish a signaling connection control part (SCCP) connection. MSC 208 and VLR 1002 then perform a required user authentication, sending an authentication request (AUTH_REQ) using the Direct Transfer Application Part (DTAP), step 1224. Access center 216 sends a Authentication Response (AUTH_RSP) message at step 1226 including a session key (SRES) for authentication (step 1226). Thus, the authentication process is completed by the access center 216 on behalf of terminal device 224.

After the authentication process, MSC 208 confirms the requested service in a CM_SERV_ACC message at step 1228. Instead of forwarding this message to access point 218, access center 216 forwards the setup request originating at terminal device 224 (step 1214) to MSC 208, at step 1230. MSC 208 confirms with a CALL_PROC message that it is processing the call setup, step 1232. This message is forwarded to terminal device 224 through access center 216 and access point 218 at steps 1234 and 1236.

At step 1238, access center 216 instructs access point 218 to setup traffic channels. This triggers an exchange of control messages involving access center 216, access point 218 and terminal device 224 at steps 1238 to 1250, which corresponds to the signaling described with reference to FIG. 11, steps 1122 to 1134.

The ASS_COM message received from access point 218 at step 1250 is forwarded from access center 216 to MSC 208 at step 1252. An ALERT message is then transmitted from MSC 208 to access center 216 (step 1254) and forwarded to terminal device 224 through access point 218 (steps 1256 and 1258), triggering a ring tone generation in terminal device 224. Similarly, a CON message is sent from MSC 208 to terminal device 224 through access center 216 and access point 218 at steps 1260 to 1264. Terminal device 224 acknowledges with a CON_ACK message to MSC 208, wherein again the message is forwarded by access point 218 and access center 216. The call is established, and user data can be exchanged between the connected terminal devices 224 and 246.

For the purpose of the present example it is assumed that terminal device 224 initiates the disconnection of the call at step 1272. The DISC message is forwarded to MSC 208 with steps 1274 and 1276. The release message generated by MSC 208 is again sent back through access center 216 to access point 218 in steps 1278 to 1282, triggering the release of the radio resource and LAPDm connections in steps 1284 to 1288.

I) Incoming Call

Figure 13:
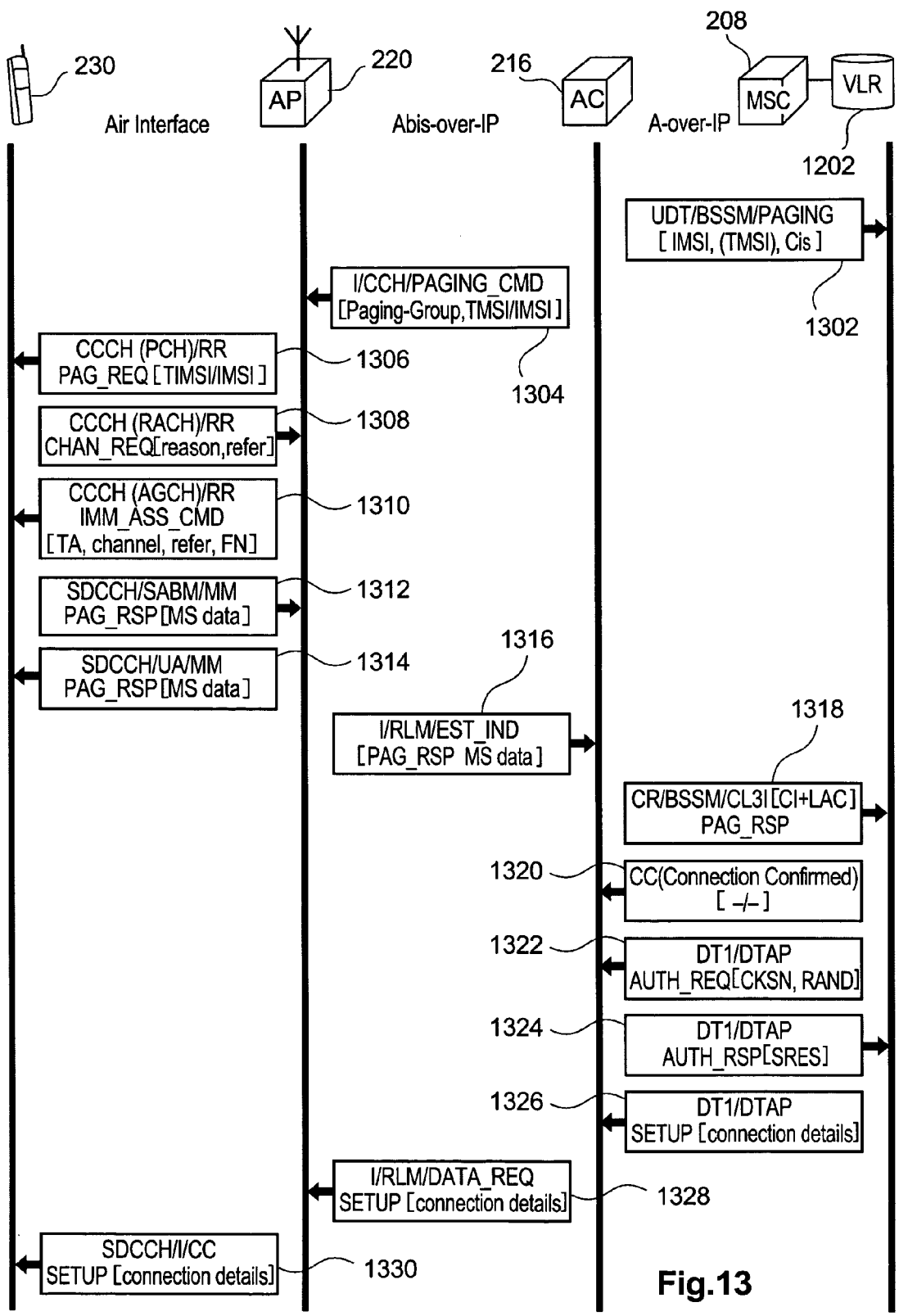
FIG. 13 shows a flow diagram representing the message flow in a call originating at a terminal device outside the coverage of an access center assigned to the called terminal device.
Figure 13:
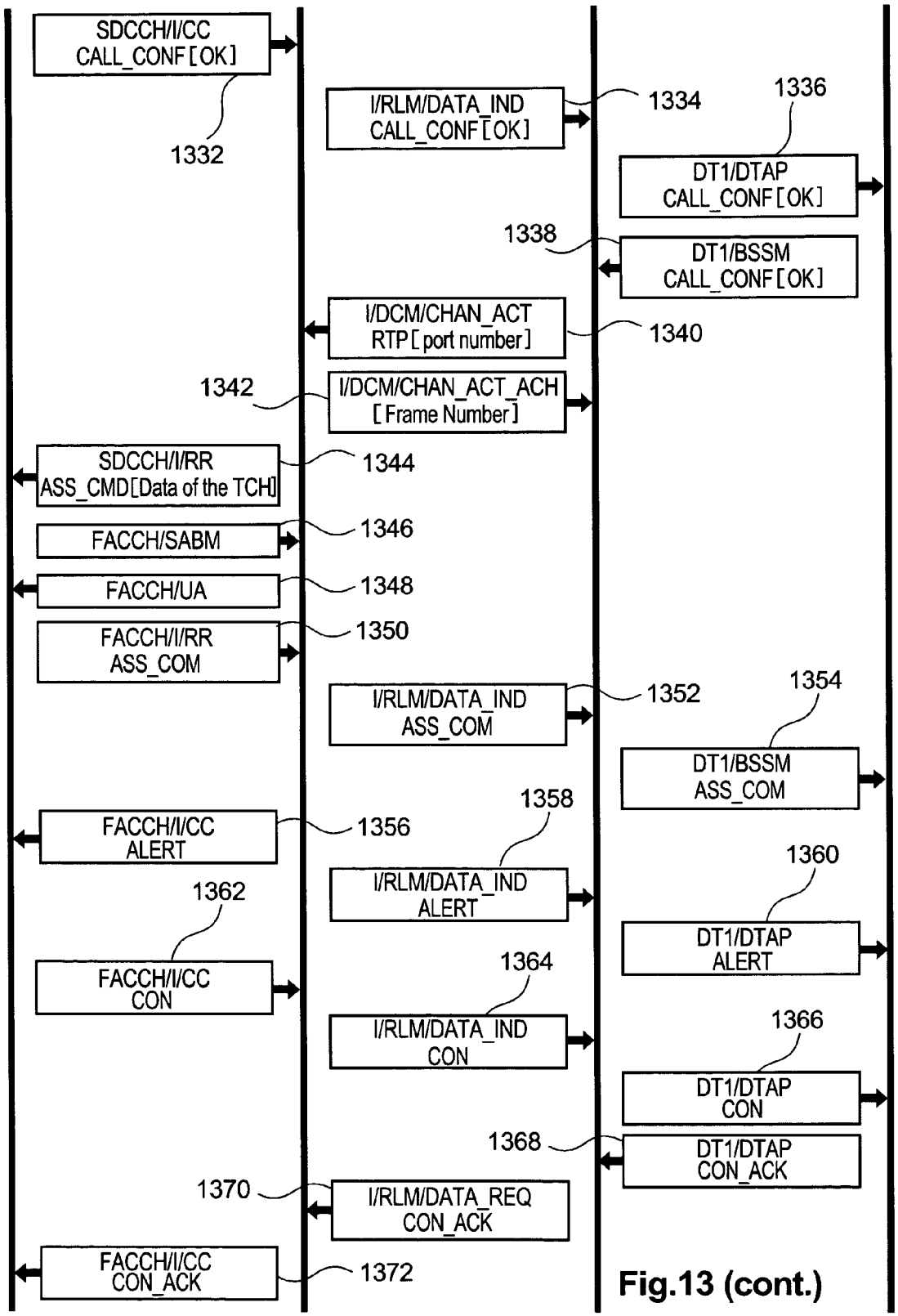

FIG. 13 shows a flow diagram representing the message flow for establishing a call to a terminal device in a network cell of an access point of the invention, which originates at a terminal device outside the coverage of the access center, to which the called terminal device is assigned. For the purpose of the present example, it is assumed that the call is placed to terminal device 230 in network cell 232 under the coverage of access point 220 and access center 216.

The message flow for initiating the call has been explained in detail for different cases with respect to FIG. 10 to 12. It is noted that the message flow shown in FIG. 13 involves MSC 208 due to an assumed origin of the call in a foreign network cell. However, it is clear to the skilled person from the description of the earlier examples that the messaging shown here can easily be transferred to the case of a call in the coverage of one access center. In that case, the access center performs the required switching functionality. Similarly, the message flow can also be transferred to the case of an intra-access-point call. In that case, the switching function is performed by the access point.

At step 1302, MSC 208 instructs access center 216 to send a paging request (PRG_REQ) message to terminal device 230 via access point 220 (steps 1304 and 1306). Access center 216 forms its own location area.

Access center 216 sends a paging command (PAGING_CMD) to the access point, which is currently associated with terminal device 230. In the present case, this is access point 220. Access point 220 intern sends a paging request to all terminal devices in the coverage of its network cell.

If terminal device 230 is reachable, access point 220 assigns a control channel. A channel request (CHAN_REQ) indicates, that terminal device 230 requests service in the context of an answer to a paging request (step 1308). At step 1312, terminal device 230 sends a SABM to access point 220 to establish a LAPDm connection. The SABM contains a paging response (PAG_RSP), which identifies the subscriber (IMSI). Access point 216 confirms the layer-2 connection by repeating the PRG_RSP message in a UA message (step 1314).

At the same time, access point 220 passes the PRG_RSP to access center 216, step 1316. Access center 216 processes the paging response by further including the location area code (LAC) and a cell identifier (CI). The entire message is put as a CL31 (BSSM) in a SCCP and send to MSC 208 at step 1318.

MSC 208 answers with a CC message to establish an SCCP connection (step 1320).

As described earlier in the context of FIG. 12, an authentication is performed, which is completed by access center 216 on behalf of terminal device 230 (steps 1322 and 1324). MSC 208 then sends a SETUP message to the terminal device 230, along with some technical preconditions regarding bearer capabilities, steps 1326 to 1330.

After receiving and checking the SETUP message, the terminal device 230 confirms its capabilities to accept this connection by sending a call-confirm (CALL_CONF) message to MSC 208 (steps 1332 to 1336).

MSC 208 then sends a ASS_REQ message to access center 216, containing the speech channel number on the A interface, step 1338. Access center 316 maps the channel number to an RTP port and sends the port number to access point 220 via the CHAN_ACT message, which is modified as compared to the GSM standard, as is described earlier. The CHAN_ACT message also instructs access point 220 to setup traffic channels (step 1340). Access point 220 acknowledges the request with a CHAN_ACT_ACK message (step 1342).

Access point 220 will then decide, which physical channel to use, again observing the physical situation on the air interface. With an ASS_CMD command, access point 220 communicates the traffic channel to terminal device 230, step 1344. Further signaling between terminal device 230, access point 220, access center 216 and MSC 208 is similar to that described earlier in the context of FIG. 12 in the setup of a user data channel. Access point 220 expects an SABM from terminal device 230, using the new channel, which enables a LAPDm layer-2 connection (step 1346). Access point 220 confirms with an UA at step 1348.

Then, at step 1350, terminal device 230 sends an ASS_COM message to establish a layer-3 traffic channel. Access point 220 releases the control channel. Access center 216 confirms the channel allocation to access point 220. The ASS_COM message is forwarded to MSC 208 at steps 1352 and 1354.

After the traffic channel assignment is completed, terminal device 230 starts ringing. Simultaneously, an ALERT message is sent from terminal device 230 to MSC 208 (steps 1356, 1358 and 1360). This will trigger an ACN towards the calling subscriber and the generation of a ring-back tone.

Alerted by ringing, the mobile subscriber accepts the call. When the user presses a button to accept the call terminal device 230 sends a CON message to MSC 208 (steps 1362 to 1366), which is conveyed to the peer as ANS message (ISUP). MCS/VLR 208 then sends a CON_ACK message to terminal device 230, which indicates the start of the call (steps 1368 to 1372).

2. SIP-Based Access-Network

Figure 14:
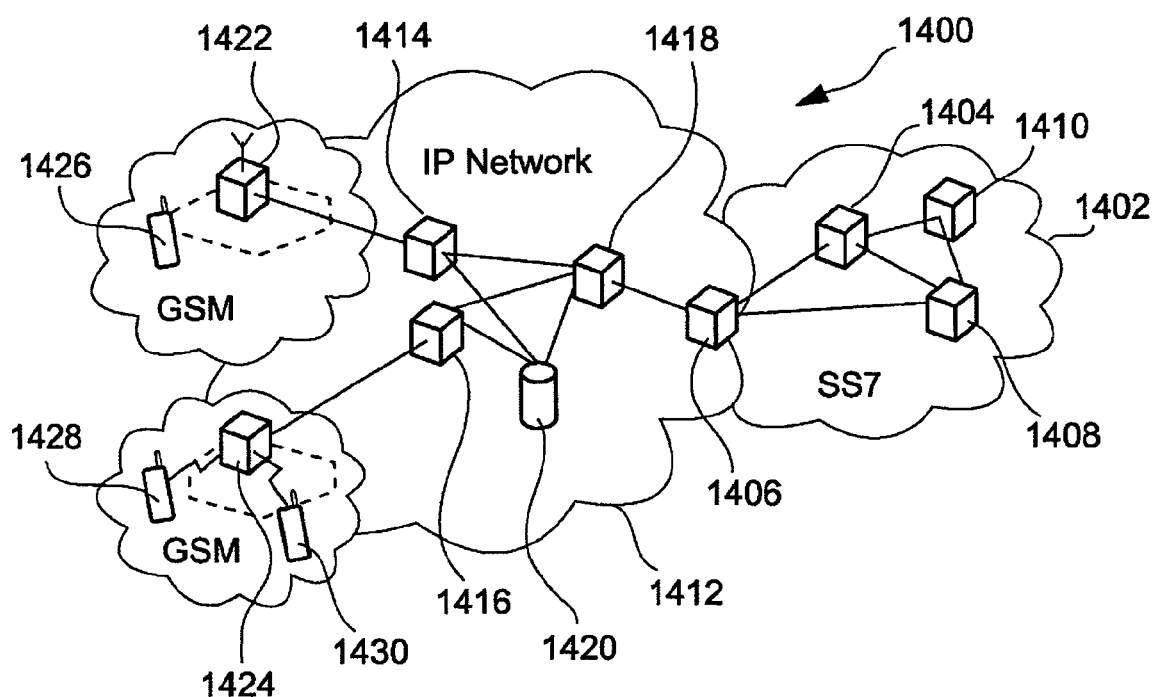
FIG. 14 shows a schematic diagram representing a structure of a GSM PLMN according to a second embodiment of the invention.

FIG. 14 shows a schematic diagram representing a structure of a GSM PLNM according to a second embodiment of the invention. A core network 1402 based on the SS7 protocol suite comprises a MSC 1404, a signaling gateway SG 1406 and a HLR/WLR 1408. Furthermore, a gateway MSC 1410 is shown. The gateway MSC is responsible for coupling communication of the core network with a PSTN or ISDN network. An IP network 1410 is connected with a core network through signaling gateway 1406. The IP network has access centers 1414 and 1416.

The GSM PLNM of FIG. 14 resembles the network structure of FIG. 2 in many aspects. However, in contrast to the network structure of FIG. 2, a logical point 1418 is arranged between the signaling gateway 1406 and the access centers 1414 and 1416. The logical point 1418 is referred to as a wireless-village (WV) gateway or WVG herein. The WV gateway converts MAP signaling used by the signaling gateway 1406 to SIP signaling on the side of the access centers. The WV gateway 1418 provides a GMSC interface to other PLMNs and a HLR interface for terminal devices roaming in PLMN 1400.

A SIP location server 1420 is connected to the access centers 1414 and 1416, and WV gateway 1418, and stores subscriber information. The SIP location server 1420 comprises two logical data bases: one that stores permanent subscriber's information, similar to that of the HLR 1408, and another one that stores dynamic subscriber's information, e.g., current location, similar to that of the VLR 1408.

WV gateway 1418, SIP location server 1420, and access centers 1414 and 1416 are interconnected by IP network 1412. IP network 1412 also connects access centers 1414 and 1416 with assigned access points 1422 and 1424, respectively.

Access points 1422 and 1424 either have integrated SIP servers for mapping GSM signaling on the side of the attached terminal devices to communication according to SIP with access centers 1414 and 1416, or are connected to SIP servers via the IP network.

Communication between access points 1422, 1424 with attached terminal devices 1426 and 1428, 1430 create SIP clients on behalf of their attached terminal devices and map GSM call-control and mobility-management control data to SIP signaling.

The interface between WV gateway 1418 and the access centers as well as between the WV gateway 1418 and the SIP location server 1420 follows standard SIP signaling carried over the IP network 1412. The protocol stack of the serving gateway 1406 and of the SG side of the WV gateway 1418 is identical to that of FIG. 3.

In the following, message flow diagrams representing different situations of a call setup and registration in the PLMN 1400 of FIG. 14 will be set forth with reference to FIGS. 11 to 14.

Figure 15:
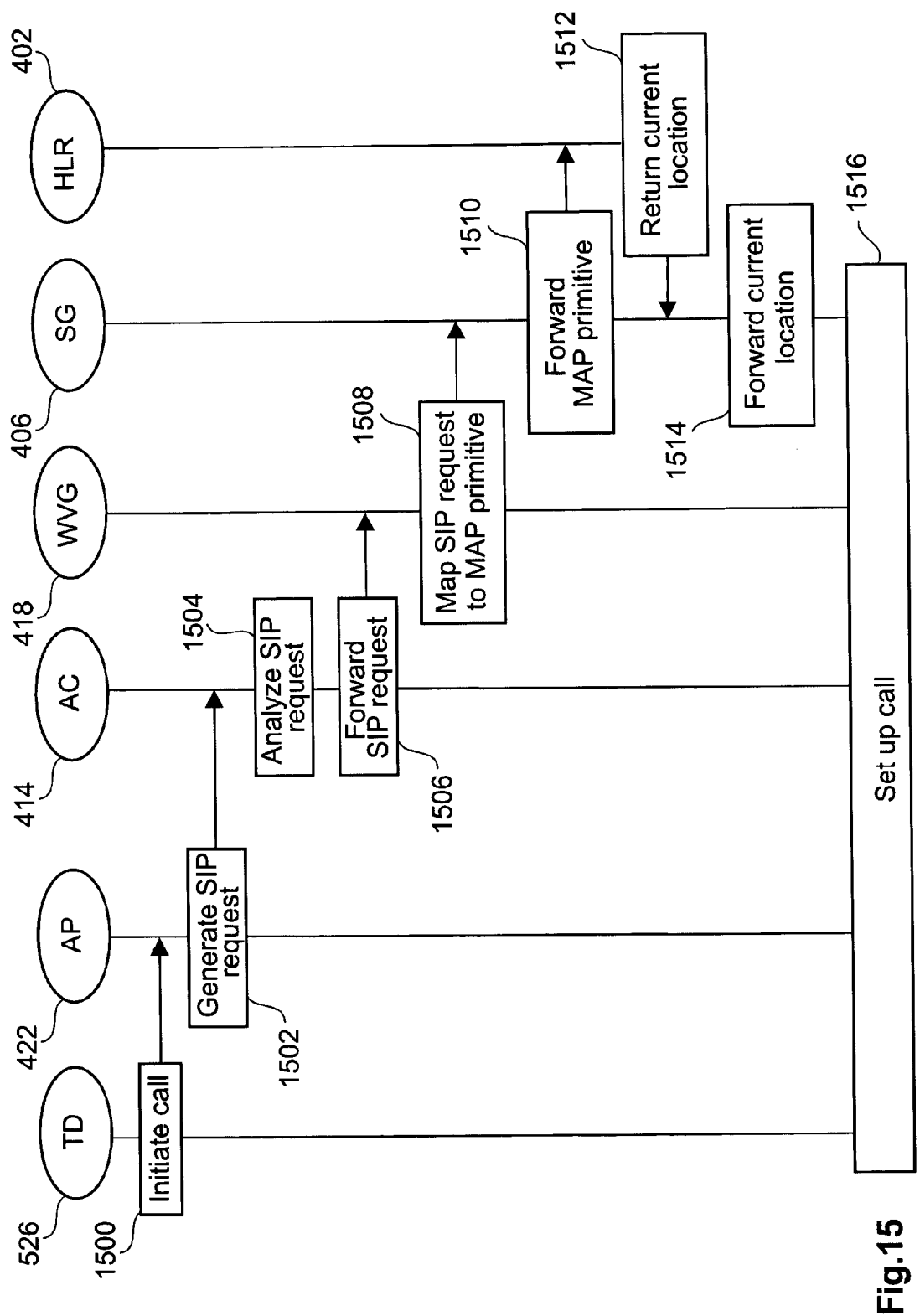
FIG. 15 shows a flow diagram representing the message flow during the setup of a call originating at a terminal device in a network cell of a RAN of a GSM PLMN according to the second embodiment of the invention.

FIG. 15 shows a flow diagram representing the message flow during the setup of a call, which originates at terminal device 226 and terminates outside the PLMN 200.

At a step 1510, terminal device 226 requests to setup a call to a terminal device outside PLMN 200. Access point 222 receives the request (1512) and converts it to a corresponding SIP request (1514). The access point ascertains that the call request is not directed to another attached terminal device and, therefore, forwards the SIP request to access center 214 (1516). Access center 214 analyzes the phone number of the called terminal device and concludes that it belongs to another PLMN (1518). Therefore, access center 214 forwards the SIP request to WV gateway 218 (1520), which converts the SIP request to MAP primitives, which are sent to signaling gateway 206 (1522). Signaling gateway 206 forwards the MAP primitives to a HLR 502 outside PLMN 200, which is assigned to the called terminal device (1524). The HLR 502 returns the current location of the called terminal device, which the WV gateway 218 uses to setup the rest of the call (1526).

This way, a terminal device in a network cell of PLMN 200 can perform a call not only to devices within the same network cell or access network, but also to the "rest of the world" outside PLMN 200.

Figure 16:
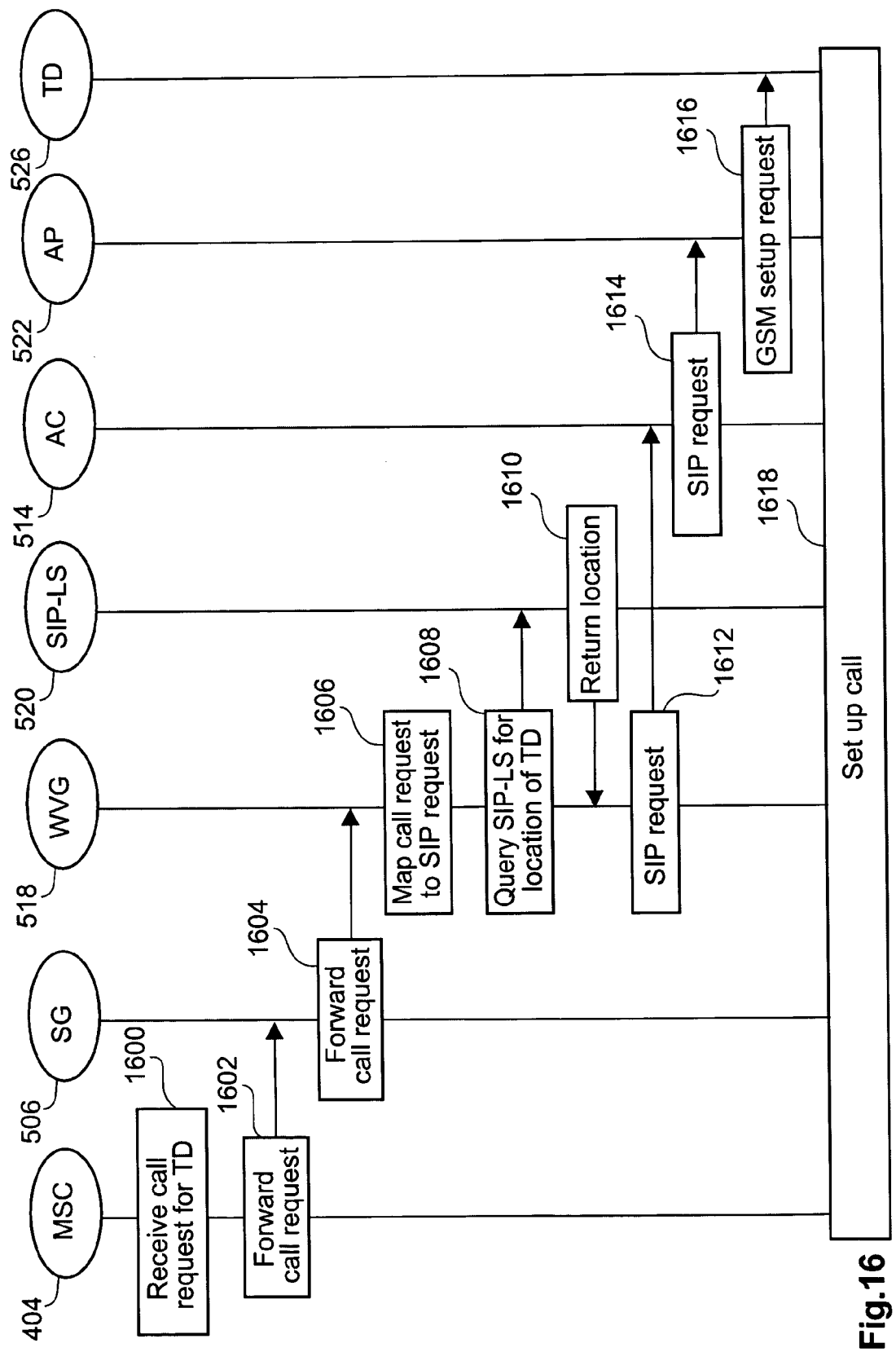
FIG. 16 shows a flow diagram representing the message flow during the setup of a call terminating at a terminal device in a network cell of a RAN of a GSM PLMN according to the second embodiment of the invention and originating outside the network cell.

FIG. 16 shows a flow diagram representing a message flow during the setup of a call terminating at terminal device 226.

The call originates outside PLMN 200. MSC 204 of PLMN 200 receives the call request for terminal device 226 (1600). It forwards the call request to signaling gateway 206, which in turn forward the call request to WV gateway 218. WV gateway 218 converts the call request to a corresponding SIP request (1606) and queries the SIP location sever 220 for the current location of terminal device 226 (1608). SIP location server 220 returns the current location to the WV gateway 218 (1610), which then proceeds the call setup with access center 214 (1612) and access point 222 through appropriate SIP messages. Access point 222 forwards the SIP request to the assigned access point 222 (1614). Access point 222 converts the SIP request to a GSM call-control message, which is sent to terminal device 226. Then, the remaining setup procedure is performed (1618) following the principles set forth above.

This way, a terminal device in a network cell of PLMN 200 can be reached not only by devices within the same network cell or access network, but also by a call from the "rest of the world" outside PLMN 200.

Figure 17:
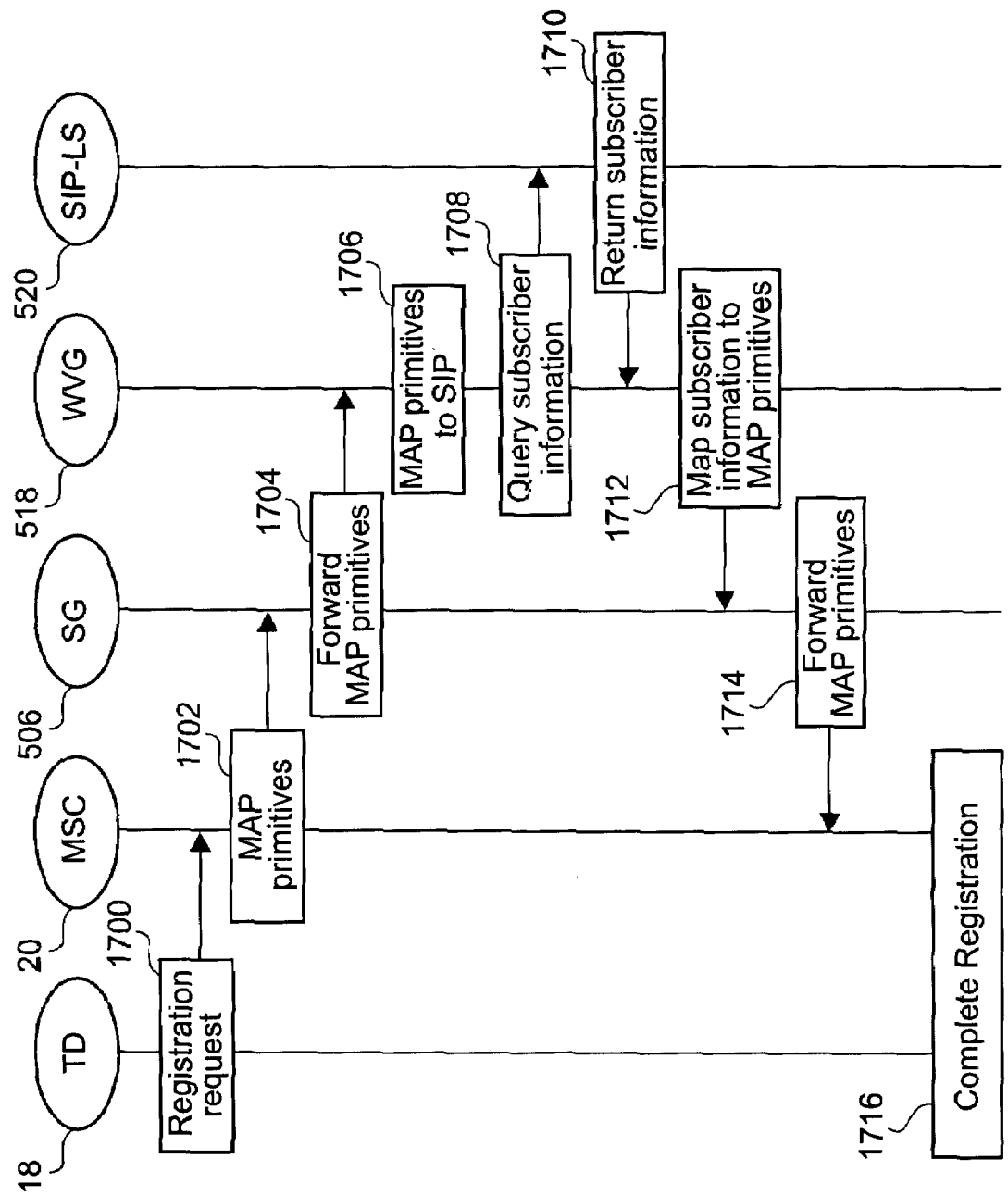
FIG. 17 shows a flow diagram representing the message flow during the registration of a terminal device in a network cell of a RAN of a foreign GSM PLMN according to the second embodiment of the invention in a case where a network cell represents the home network cell of the end user.

FIG. 17 shows a flow diagram representing the message flow during the registration of a terminal device in a network cell of a RAN of a foreign GSM PLMN according to the second embodiment of the invention in a case, where a network cell represents the home network cell of the end user.

The permanent subscriber's information of a terminal device 1718 is stored in SIP location server 220 of PLMN 200. When terminal device 1718 is roaming outside PLMN 200, it sends a registration request to a serving MSC of the corresponding PLMN. The serving MSC knows the SS7 address of the WV gateway 218 from the International Mobile Subscriber Identity (IMSI) number received from terminal device 1718. WV gateway 218 converts the received MAP primitives to SIP (1706) and queries SIP location server 220 for the permanent subscriber information (1308). SIP location server 220 responds with SIP messages containing the appropriate subscriber information (1710). This information is mapped into MAP primitives by WV gateway 218 (1712), forwarded to serving gateway 206 (1714) and to the serving MSC 1720 (1714), which intern completes registration of terminal device 1718 (1716).

This way, a terminal device having a permanent registration with PLMN 200 can also be used outside PLMN 200.

Figure 18:
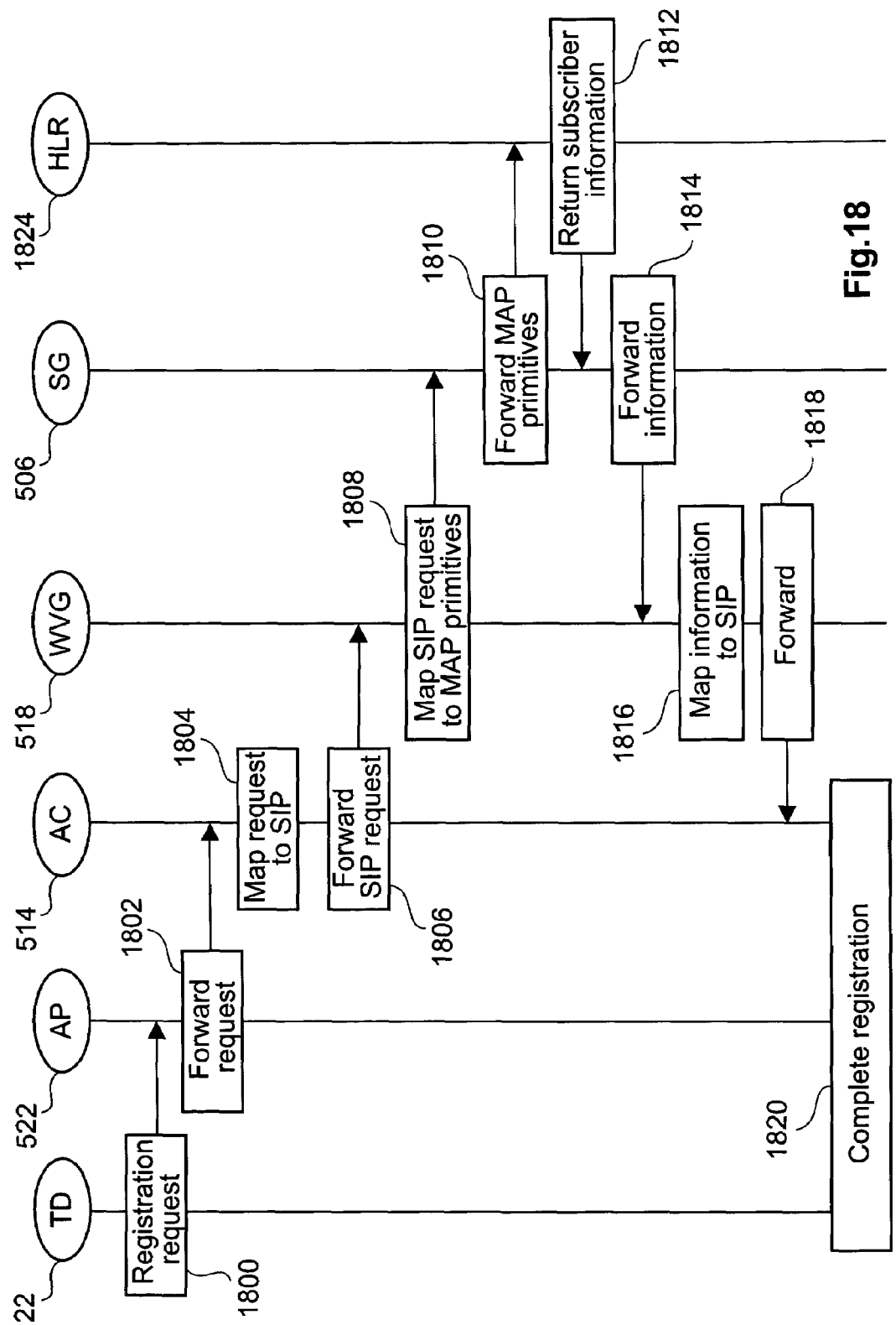
FIG. 18 shows a flow diagram representing the message flow during the registration of a roaming foreign terminal device in a network cell of a RAN of a GSM PLMN according to the second embodiment of the invention.

FIG. 18 shows a flow diagram representing the message flow during the registration of a roaming foreign terminal device in a network cell of PLMN 200 of FIG. 4. Foreign terminal device 1822 sends a registration request to the access point, which provides GSM coverage at the location of terminal device 1822. For the purpose of the present example, it is assumed that terminal device 1822 communicates with access point 222. Access point 222 forwards the GSM registration request to access center 214, which converts the contained call control and mobility management messages to appropriate SIP messages (1804). The generated SIP request is forwarded to WV gateway 218, which intern maps the SIP request to MAP primitives. The primitives are sent to serving gateway 206, which forwards them to a HLR 1824 of terminal device 1822, which can be identified from the IMSI received from terminal device 1822. The HLR 1824 returns the requested subscriber information to serving gateway 206, which forwards the information to WV gateway 218. WV gateway converts the received information to a SIP message, which is sent to access center 214, which intern completes the registration of terminal device 1822 via access point 222.

This way, PLMN 200 does not only allow radio access to its permanently registered users, but also to terminal devices from foreign PLMNs.

3. Access-Point Node

Figure 19:
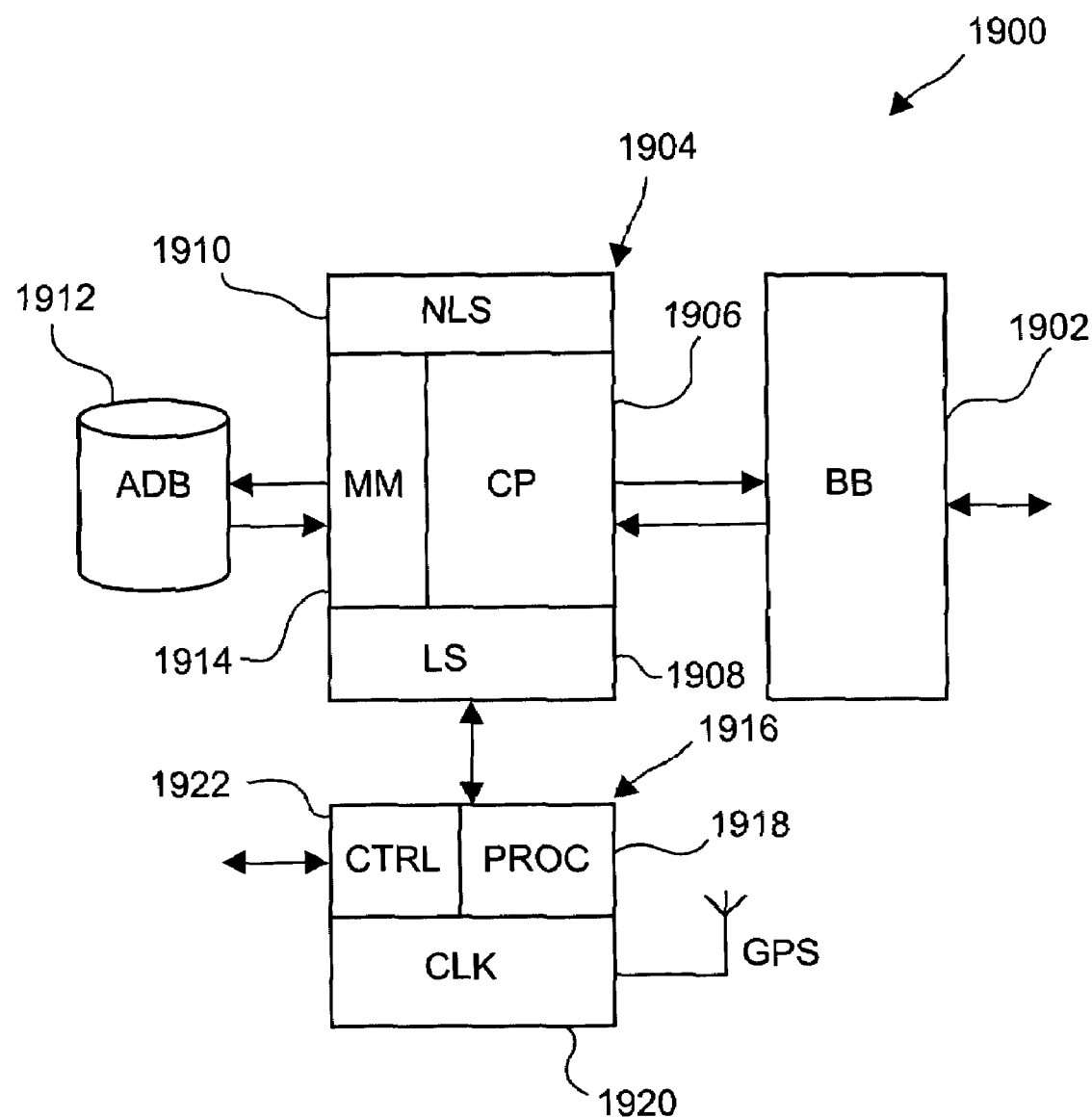
FIG. 19 shows a block diagram of an access-point node according to an embodiment of the invention.

FIG. 19 shows a block diagram of an access-point node 1900 according to a preferred embodiment of the invention. The block diagram is strongly simplified. All functional elements related to transmission, reception, amplification, conversion between analog and digital signals are omitted. A base-band processing unit 1902 summarizes all functional units related to base-band processing. The base-band processing unit provides a physical-layer (layer-1) exchange with a callcontrol unit 1904.

Call-control unit 1904 comprises a call processing unit 1906, a local switching unit 1908, a non-local switching unit 1910, and a mobility management unit 1912 which are interconnected with each other. Call-processing unit 1906 is connected to an integrated access database 1912 via a mobility-management unit 1914.

Call-control unit 1904 provides all signaling related to the control of protocol layer 2 and higher protocol layers with terminal devices in the served network cell and with an assigned access-center node. The interface with the access-center node is not shown.

Call-processing (CP) unit 1906 performs Radio Resource (RR) management for local- and non-local connections. Mobility-management (MM) unit 1914 performs MM functionality and maintains access database 1912.

Local-switching (LS) unit 1908 controls establishing, maintaining and releasing circuit-switched user-data channels and control-data channels to terminal devices located in the network cell served by access point 1900 in layers 3 and higher.

Non-local switching (NLS) unit 1910 controls the exchange of packetized user data and control data with the assigned superordinate access-center for establishing, maintaining and releasing communication between terminal devices located in the network cell and a terminal devices located outside the network cell in layers 3 and higher. The protocol stack used by non-local switching unit 1910 and call processing unit 1906 in providing non-local communication corresponds to that used by the assigned access center and shown in FIG. 2 on the right-hand side for access center 214.

A general-control unit 1916 comprises a programmable processing unit 1918 connected to a clock-unit 1920 and an external-control unit 1922 providing an interface for external control operations. Clock unit 1920 comprises a GPS (Global Positioning System) receiver for retrieving external clock signals and transforming them into internal clock signals used in the operation of access-point node 1900. Call-control unit is in one embodiment provided as a module with interfaces to general-control unit 1916 and base-band processing unit 1902.

The system and architecture described herein can be adapted for implementation in any kind of wireless network system, for instance also in WLAN and Bluetooth networks, etc.

4. Access-Center Node

Figure 20:
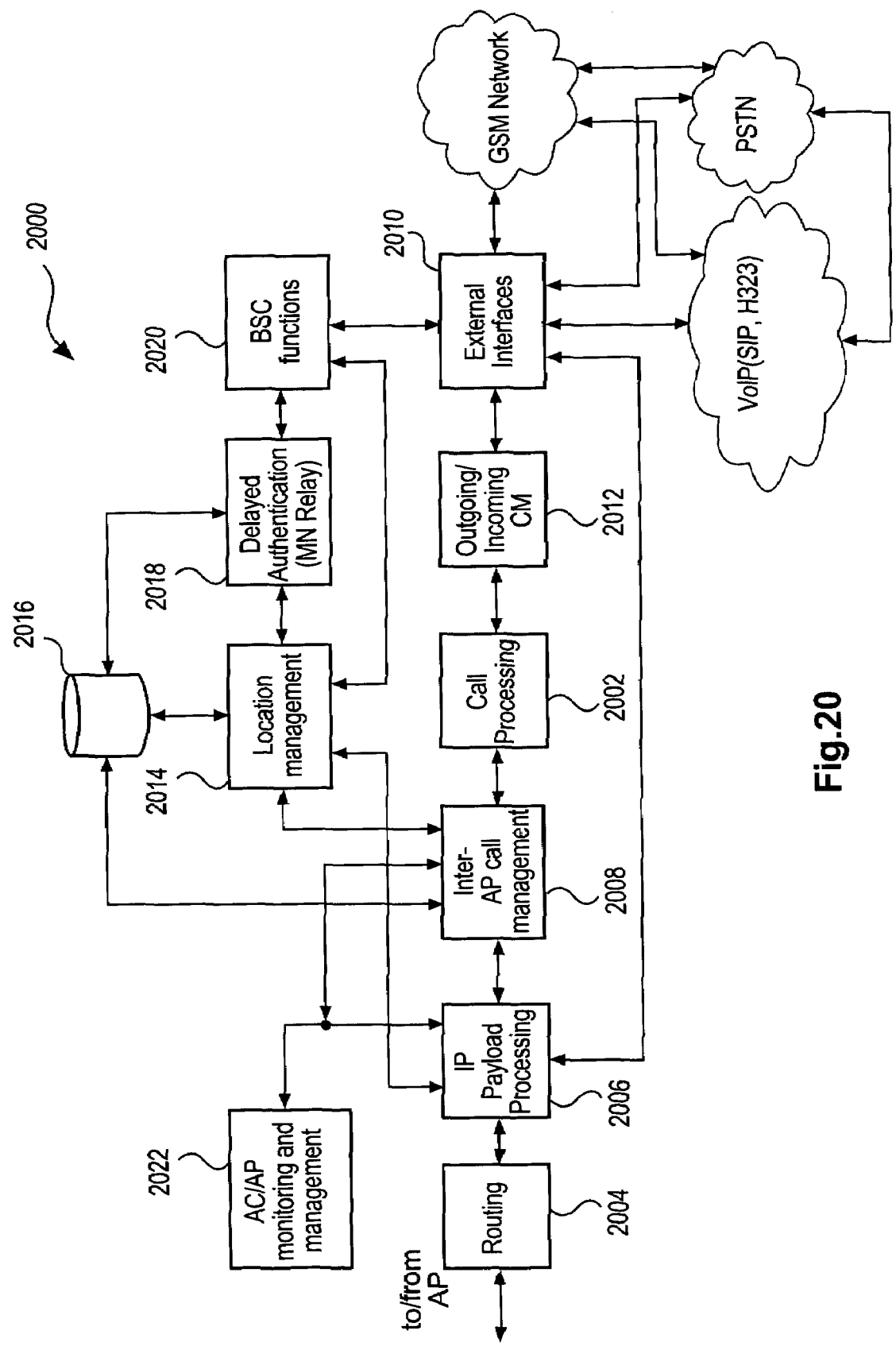
FIG. 20 shows a block diagram of an access-center node according to an embodiment of the invention.

FIG. 20 shows a functional block diagram of an embodiment of an access-center node 2000.

Access-center node has a call processing unit 2002, which performs decoding functions and generates appropriate signaling for inter-access-point calls as well as for outgoing and incoming calls involving a foreign network such as a GSM network, a voice-over-internet-protocol (VoIP) network or a PSTN network.

For communication with subordinate access points, access-center 2000 has a routing unit 2004, which performs layer-3 IP processing as known in the art.

As noted before, access point and access-center are adapted to work independently in case the link between them is lost. The main transport is performed using IP. The protocols used are configurable and can work on low-bandwidth links like typically 60 Kbps between access-center and access point (example: the "CorDECT" cordless system standard) up to high-bandwidth-links like wireless MAN networks such as Wi-MAX and others.

The payload, which is received from an access point, and the payload, which is to be sent to an access point, is processed in IP-payload-processing unit 2006. The processing involves packetizing the payload data into IP data packets for outgoing payload data, and depacketizing received payload data, which are to be processed by access-center 2000. Data packets containing user data related to an inter-access-point call are forwarded to inter-AP-call-management unit 2008. Payload data related to a call with an external network are forwarded to an external-interface unit 2010. External-interface unit 2010 provides adaptation towards the call-network. As mentioned above, the external network is in one embodiment a GSM network. In this embodiment, external-interface unit 2010 of FIG. 20 provides a protocol adaptation as described with reference to FIG. 2.

In another embodiment, external-interface-unit provides adaptation for direct communication with a public switched telephone network (PSTN). Here, in contrast to the aforementioned embodiment, a GSM core network is not needed for establishing calls to a PSTN. However, telephone calls to other GSM networks can be established via the PSTN network. An access-center having only an interface to a PSTN network need not perform any GSM-specific functions like location management or authentication. However, the subordinate access point will still perform location management and also authentication procedures for terminal devices. For the access point needs to determine whether a terminal device making use of the network services is permanently or only temporarily registered with the particular access point.

In a similar way, another alternative embodiment has an external-interface unit 2010, which provides communication with an external VoIP-network, which may be based on SIP- or H323-signaling.

In a further embodiment, external interface unit 2010 comprises at least two interface units, each providing adaptation towards one of the aforementioned core networks. In this embodiment, access-center 2000 is flexible in communication with external networks.

It is noted that connectivity with external networks need not be present continuously. In fact, as mentioned before, connectivity to an external core network is in some embodiments not a requirement, if only inter-access-point connectivity between mobile terminals shall be provided. Signaling with the connected core network is therefore performed if and when the link between access-center 2000 and the core network is functioning. This implies that some functionality like authentication or location update may be performed with a delay in respect to a corresponding request of a terminal device. If a call request from a terminal device currently located in the coverage of an access point assigned to access-center 2000 cannot be forwarded to the core network due to a temporarily missing link, access-center 2000 will inform the requesting terminal device accordingly. As a special service provided in one embodiment, a call request can in this case be saved and performed later on behalf of the requesting terminal device.

Call-management unit 2012 provides management of outgoing and incoming calls. A location management unit 2014 is provided in access-center 2000 for performing location management related to mobile terminals located in the network cells of subordinate access points. Location-management unit 2014 maintains an access-data base 2016. Access-data base comprises a subscriber database comprising a list of valid subscribers in the assigned network cells and the subscription information related to the subscribers. Further, access-data base maintains a list of current active users and their associations to respective subordinate access points.

Location management 2014 is connected to a delayed-authentication unit 2018, which performs authentication on behalf of a terminal device located in an assigned network cell towards a MSC in a GSM core network. In this authentication procedure, the respective terminal device is not involved.

Optionally, access-center 2000 comprises a BSC-unit 2020, which emulates BSC functions for users of standard GSM networks who operate their terminal device in a network cell assigned to access center 2000. In an embodiment containing BSC unit 2020, a subscriber of a standard GSM network will be able to seamlessly operate its terminal device in the coverage of access center 2000. Also, handover functionality can be provided in this embodiment for a subscriber moving from network cell to network cell within the coverage of access-center 2000.

Furthermore, access-center 2000 comprises a monitoring unit, which is adapted to perform monitoring and management functions for the access center and the assigned access points. Furthermore, monitoring unit 2022 is adapted to report the status of assigned access points and access-center failures. Further, monitoring unit 2022 is adapted to perform operational procedures associated with the access-center.

5. Use Case Examples

The above description of different embodiments of network structures and signaling examples shows that the invention provides for low-cost wireless communication facilities using ubiquitous GSM terminal devices even in the absence of standard GSM network coverage.

An access point of the invention provides an insular network cell for communication between terminal devices located in that network cell. The access point is autonomous in that no further network node is needed in establishing maintaining and releasing a call between two terminal devices located in the network cell. In contrast, prior-art GSM networks are not able to switch phone calls without the signaling capabilities of a core network. Therefore, the access point of the invention is particularly useful to provide wireless communication in areas, where installation, operation and maintenance of a GSM network did not seem economically feasible so far on the basis of the prior-art technology. A preferred application of the invention is therefore a wireless village phone service.

A number of access points can be grouped and linked together by providing an access-center. This way, the coverage of the wireless communication service can be extended to cover all network cells assigned to the same access-center. This way, phone calls between different network cells are enabled, still without any contribution of a GSM or other call network.

Finally, an access-center may be provided with an interface to a core network such as a GSM, a VoIP or PSTN network. This way, subscribers to an access point can communicate with the rest of the world.

The above summary shows that the network structure of the invention provides flexibility for an operator of an access point in that the communication services can be more or less restricted with respect to area coverage. In the following, examples of different subscription plans, which are supported by the network structure of the invention, will be described in more detail.

In a basic subscription plan, hereinafter referred to as plan A, a user subscribed to an access point can make calls within the coverage of the access point and to terminal devices in the coverage of another access point assigned to the same access-center. The service is preferably based on a monthly flat-rate billing. This means that the user pays a monthly rate and is allowed to make and receive an unlimited number of calls without any surcharge.

The access point will generate call-logs for a subscriber according to plan A and store them in its access database for legal purposes. It is noted again that subscription information for users according to plan A is kept only in the access databases of the access point and the superordinate access-center. There is no communication required with a GSM operator.

Users according to subscription plan A do not receive any service in case they wish to operate their terminal device in the coverage of another access-center or of a standard GSM network.

In an enhanced subscription plan, hereinafter referred to as plan B, a subscriber receives all service features of subscription plan A. In addition, the subscriber can receive unlimited incoming calls. That means, the subscriber can be reached also from network cells assigned to another access-center or from a GSM network. However, the subscriber cannot initiate a call to these networks. In this subscription plan, the access-center will communicate to the connected core network when the terminal device is turned on and off. Also, the assigned access-center will perform delayed authentication and location management procedures with the core network. It depends on the particular deployment, whether this delayed authentication and location management is necessary at all.

According to an enhanced subscription plan, hereinafter plan C, a subscriber to an access point receives all service features of subscription plans A and B. In addition, a user can make calls to terminal devices in network cells assigned to a different access-center and to terminal devices in a standard GSM network on a pre-paid basis. In this case, the access point comprises a charging unit, which is adapted to perform metering and to generate control signals, which will initiate the disconnection of a call, if the pre-paid amount is used up. The charging unit is preferably implemented as an executable software in the access point.

According to an alternative enhanced subscription plan, hereinafter plan D, a subscriber to an access point receives all service features covered by plans A and B. However, the user can also initiate phone calls like subscribers to a standard GSM network. According to plan D, the subscriber may either receive a single bill from his access-center or access-point operator. Alternatively, the subscriber may receive two bills, one from the GSM operator and another from the accesscenter or access-point operator.

A supplementary service feature, which may be included into subscription plan D is to allow a subscriber to connect to a standard prior-art GSM network or to another network cell of an access point assigned to a different access-center. In this case, the authentication and location updates will be performed in the HLR of the GSM network.

The invention claimed is:

1. An access-point node to a network cell of a radio access network, the access-point node comprising:
  a call-processing unit that is configured to ascertain whether an incoming communication request originates from an originating terminal device located inside the network cell and whether the incoming communication request is directed to the terminating terminal device located inside the network cell,
  a local-switching unit that is connected with the call processing unit and configured to
    establish, maintain, and release upon reception of a communication request originating and terminating inside the network cell a local user-data radio channel consisting of a first local channel section having as endpoints a first terminal device located in the network cell and the access-point node, and of a second local channel section having as endpoints the access-point node and a second terminal device located in the network cell, and establish, maintain, and release the first local channel section upon the reception of a communication request that is either originating from or terminating at the first terminal device inside the network cell, and a non-local-switching unit that is connected with the call-processing unit and configured to exchange packetized user data and control data with an assigned superordinate access-center node for establishing, maintaining and releasing communication between the first terminal device located in the network cell and a third terminal device located outside the network cell.

2. The access-point node of claim 1, wherein the call-processing unit is configured to generate and interpret control data directed to or received from the first or second terminal device and related to establishing, maintaining, or releasing the local user-data radio channel.

3. The access-point node of claim 1, which is further configured to exchange control data with the first or second terminal device through at least one control-data radio channel.

4. The access-point node of claim 1, further comprising a clock-generation unit with a receiver wherein the clock-generation unit is configured to receive an external clock signal through a wireless channel, and which is configured to derive an internal clock signal from the external clock signal.

5. The access-point node of claim 1, wherein the call-processing and local-switching units are configured to perform signaling and call-switching functions for establishing, maintaining and releasing a local user-data channel according to a signaling system standard SS7.

6. The access-point node of claim 1, wherein the mobility-management unit is configured to packetize and send to the superordinate access-center node, control data received from the first terminal device in relation to a registration of the first terminal device with a core network connected with the access-point node.

7. The access-point node of claim 1, wherein the non-local switching unit comprises a packetizer that is configured to generate data packets according to an internet protocol (IP), the data packets including user data or control data.

8. The access-point node of claim 1, which is configured to interpret and generate control data according to a session initiation protocol, (SIP).

9. The access-point node of claim 1, which is configured to communicate with the access-center node through a wired communication channel.

10. The access-point node of claim 1, which is configured to communicate with the superordinate access-center node through a wireless communication channel.

11. The access-point node of claim 1, having a first access database connected to the call-processing unit and comprising data related to terminal devices, which are permanently or temporarily registered to the access-point node.

12. The access-point node of claim 11, comprising a mobility-management unit connected to the first access database and the call-processing unit and configured to maintain the first access database.

13. The access-point node of claim 11, wherein the mobility-management unit is configured to extract an IMSI value of a terminal device from a location-update-request message, that is received from the terminal device.

14. The access-point node of claim 11, wherein the mobility-management unit is configured to obtain from a terminal device within a coverage of the access-point node, upon request from the terminal device within a coverage of the access-point node or automatically after a predetermined time span following a last location update for the terminal device within a coverage of the access-point node, an IMSI value, a temporal-mobile-subscriber-identity (TMSI) value, and an international-mobile-equipment-identity (IMEI) value allocated to the terminal device within the coverage of the access-point node.

15. The access-point node of claim 14, wherein the mobility-management unit is configured to update a current location of the terminal device in the coverage of the access-point node in the first access data base.

16. The access-point node of claim 15, wherein the mobility-management unit is configured to
    ascertain whether the IMSI value is allocated to a registered terminal device held as registered to the access-point node in the first access data base,
    send to the access-center node a third control message indicating that the IMSI value of the registered terminal device is not contained in the first access database,
    wait for reception of a fourth control message from the access-center node indicating that the registered terminal device is registered with an external access-point node allocated to the access-center node, and
    send to the terminal device a fifth control message indicating completion of a location update, if the IMSI value is contained in the first access data base or the fourth control message has been received from the access-center node.

17. The access-point node of claim 11, wherein the mobility-management unit further is configured to authenticate a requesting terminal device located in the network cell and requesting authentication, based on a successful validity check of an international-mobile-subscriber-identity (IMSI) value, in either the first access data base or a second access data base maintained at the access-center node.

18. The access-point node of claim 17, wherein the mobility-management unit is configured to
    extract the IMSI value from an authentication request message received from the requesting terminal device,
    ascertain whether the IMSI value is allocated to a registered terminal device held as permanently registered to the access-point node in the first access data base, and
    generate and transmit a random number to the registered terminal device.

19. The access-point node of claim 18, wherein the mobility-management unit is configured to update an entry of the registered terminal device in the first access data base if the IMSI value is allocated to the registered terminal device registered to the access-point node.

20. The access-point node of claim 7, wherein the mobility-management unit is configured to
    send a first control message to the access-center node indicating that an IMSI contained in the authentication request message received from the requesting terminal device is not contained in the first access database,
    wait for reception of a second control message from the access-center node indicating that the registered terminal device is registered with an external access-point node allocated to the access-center node, and
    generate and transmit a random number to the registered terminal device after receiving the second control message.

21. The access-point node of claim 18, wherein the mobility-management unit is configured to use a preconfigured seed value in generating the random number for all terminal devices registered to the access-point node.

22. The access-point node of claim 18, wherein the mobility-management unit is configured to use the IMSI value of the registered terminal device as a seed value in generating the random number.

23. The access-point node of claim 18, wherein the mobility-management unit is further configured to store in the first access data base an entry allocated to the requesting terminal device requesting authentication, indicating that the requesting terminal device is currently in the coverage of the access-point node.

24. The access-point node of claim 18, wherein the mobility-management unit is configured to generate a control message for transmission to the access-center node, the control message indicating that the requesting terminal device is currently in a coverage of the access-point node.

25. The access-point node of claim 18, wherein the mobility-management unit is further configured to perform an additional authentication procedure according to a global system for mobile communication (GSM) standard, if the authentication is to be performed for a terminal device that is not permanently registered to the access-point node.

26. An access-point module for implementation in a base transceiver station of a radio access network, the access-point module comprising:
   a call-processing unit configured to ascertain whether an incoming communication request originates from an originating terminal device located inside a network cell and whether the incoming communication request is directed to a terminating terminal device located inside the network cell,
   a local-switching unit configured to establish, maintain, and release a local user-data radio channel, consisting of a first local channel section having as endpoints a first terminal device located in the network cell and the access-point node, and a second local channel section having as endpoints the access-point node and a second terminal device located in the network cell,
   a non-local switching unit configured to exchange packetized user data and control data with an assigned superordinate access-center node for establishing, maintaining and releasing communication between the first terminal device and a third terminal device located outside the network cell, and
   an interface unit connected with the call processing unit, the local-switching unit and the non-local switching unit and configured to connect with the base transceiver station and to exchange control data and user data with the base transceiver station.

27. The access-point module according to claim 26, which is formed by executable software embodied on a computer-readable medium.

28. The access-point module of claim 26, wherein the call-processing unit is configured to generate and interpret control data directed to or received from the first or second terminal device and related to establishing, maintaining, or releasing the local user-data radio channel.

29. An access-center node for providing communication between at least two assigned subordinate access-point nodes to network cells of a radio access network, or between an assigned subordinate access-point node and an assigned superordinate core-network node, the access-center node comprising:
   a call-control unit configured to ascertain whether an incoming communication request originates from an originating terminal device in a network cell of an assigned subordinate access-point node and whether the incoming communication request is directed to a terminating terminal device located inside the network cell of the assigned subordinate access-point node,
   a regional-switching unit connected to the call-control unit and configured to
      exchange packetized user data and control data with an assigned subordinate first access-point node to a first network cell and with an assigned subordinate second access-point node to a second network cell to establish, maintain and release a predefined transmission capacity for a regional packet-switched user-data transmission path consisting of a first regional transmission path section having as endpoints the first access-point node and the access-center node, and further consisting of a second regional transmission path section having as endpoints the access-center node and the second access-point node, for establishing communication between a first terminal device located in the first network cell and a second terminal device located in the second network cell, and
   a wide-area switching unit is connected to the call control unit and configured to exchange the packetized user data and control data with the first access-point node and with an assigned superordinate core network node in a core network for establishing, maintaining and releasing a wide-area user-data transmission path section consisting of the first regional transmission path section and a third regional transmission path section having as endpoints the access-center node and the core-network node.

30. The access-center node of claim 29, which is configured to generate data packets according to an Internet protocol (IP), an individual data packet including either packetized user data or packetized control dataor both.

31. The access-center node of claim 29, which is configured to interpret and generate control data according to a session initiation protocol (SIP).

32. The access-center node of claim 29, which is configured to communicate with an assigned access-point node through a wired communication channel.

33. The access-center node of claim 29, which is configured to communicate with an assigned access-point node through a wireless communication channel.

34. The access-center node of claim 29, which is configured to communicate with an assigned gateway node through a wired communication channel.

35. The access-center node of claim 29, which is configured to communicate with an assigned gateway node through a wireless communication channel.

36. The access-center node of claim 29, further comprising a second access database comprising data related to terminal devices that are permanently or temporarily registered to all assigned access-point nodes.

37. The access-center node of claim 36, further configured to maintain the second access database.

38. The access-center node of claim 37, which is further configured to receive from the assigned first access-point node a third control message indicating that an IMSI value of a terminal device, for which a location update procedure is being performed at the access-point node, is not contained the first access data base of the first access-point node, ascertain whether the IMSI value is allocated to a registered terminal device held as registered to one of the access-point nodes assigned to the access-center node, transmit a fourth control message to the first access-point node indicating that the registered terminal device is registered with a second access-point node allocated to the access-center node.

39. The access-center node of claim 38, which is further configured to send a sixth control message to the second access-point node requesting a validity status of the IMSI value received from the first access-point node, to wait for a seventh control message indicating the validity status, and to transmit the fourth control message to the first access-point node if the seventh control message indicates that the IMSI value is valid.

40. The access-center node of claim 36, which is configured to to receive a first control message from the first access-point node indicating that an international-mobile-subscriber-identity (IMSI) value contained in an authentication request message of a requesting terminal device is not contained in the first access database,
ascertain whether the IMSI value is allocated to a registered terminal device held as registered to one of the access-point nodes assigned to the access-center node, and
transmit a second control message to the access-point node, the second control message indicating that the registered terminal device is registered with a second access-point node allocated to the access-center node.

41. The access-center node of claim 40, which is further configured to store in the second access data base an entry allocated to the requesting terminal device requesting authentication, indicating that the requesting terminal device is currently in a coverage of the access-point node, which sent the first control message.

42. The access-center node of claim 41, which is further configured to send to a gateway node an eighth control message indicating a finding that the IMSI value of the registered terminal device is not contained in the second access data base,
wait for reception of a ninth control message from the gateway node indicating that the registered terminal device is registered with an external radio access network, and
send to the first access point node an tenth control message indicating the finding.

43. An access-center module for connection with a base transceiver station or a base station controller of a radio access network and for providing communication between at least two assigned subordinate access-point nodes to network cells of a radio access network or between one assigned subordinate access-point node and an assigned superordinate core network node, the access-point module configured to
ascertain whether an incoming communication request is directed to a terminal device located inside a network cell of an assigned subordinate access-point node,
exchange packetized user data and control messages with an assigned subordinate first access-point node to a first network cell and with an assigned subordinate second access-point node to a second network cell, establish, maintain and release a predefined transmission capacity for a regional packet-switched user-data transmission path consisting of a first regional transmission path section having as endpoints the first access-point node and the access-center node and of a second regional transmission path section having as endpoints the access-center node and the second access-point node, for establishing communication between a first terminal device located in the first network cell and a second terminal device located in the second network cell, and
exchange the packetized user data and control messages with the first access-point node and with an assigned superordinate gateway node of a core network for establishing, maintaining and releasing communication between the first terminal device located in the first network cell and a fourth terminal device located in a third network cell of a third access-point node, that is not assigned to the access-center node, or in a network cell outside a radio access network.

44. The access-center module of claim 43, further comprising a second access database comprising data related to terminal devices that are permanently or temporarily registered to all assigned access-point nodes.

45. The access-center module according to claim 43, which is formed by executable software embodied on a computer-readable medium.

46. The radio access network of claim 45, wherein the access-center node includes
a call-control unit configured to ascertain whether the incoming communication request originates from the originating terminal device in the network cell of an assigned subordinate access-point node and whether the incoming communication request is directed to the terminating terminal device located inside the network cell of the assigned subordinate access-point node, and whether the incoming communication request is directed to the terminating terminal device located inside the network cell of the assigned subordinate access-point node,
a regional switching unit connected to the call-control unit and configured to exchange packetized user data and control data with an assigned subordinate first access-point node to a first network cell and with an assigned subordinate second, access-point nodes to a second network cell to establish, maintain and release a predefined transmission capacity for a regional packetswitched user-data transmission path consisting of a first regional transmission path section having as endpoints the first access-point and further consisting of a second regional transmission path section having as endpoints the access-center node and the second access-point node, ffor establishing communication between the first terminal device located in the first network cell and the second terminal device located in the second network device,
a wide-area switching unit is connected to the call control unit and configured to exchange the packetized user data and control data with the first access-point node and with an assigned superordinate core network node in a core network for establishing, maintaining and releasing a wide-area user-data transmission path section consisting of the first regional transmission path section and a third regional transmission path section having as endpoints the access-center node and the core-network node.

47. The radio access network of claim 46, wherein each access-point node is assigned to one of the access-center nodes.

48. A radio access network comprising:
a plurality of access-point nodes wherein at least one node of the plurality of access-point nodes includes
a call-processing unit that is configured to ascertain whether an incoming communication request originates from an originating terminal device located inside a network cell and-whether the incoming communication request is directed to a terminating terminal device located inside the network cell, a local-switching unit that is connected with the call processing unit and configured to establish, maintain, and release upon reception of a communication request originating and terminating inside the network cell a local user-data radio channel consisting of a first local channel section having as endpoints a first terminal device located in the network cell and the access-point node, and further consisting of a second local channel section having as endpoints the access-point node and a second terminal device located in the network cell, and establish, maintain, and release the first local channel section upon the reception of a communication request that is either originating from or terminating at the first terminal device inside the network cell, and a non-local-switching unit that is connected with the call-processing unit and configured to exchange packetized user data and control data with an assigned superordinate access-center node for establishing, maintaining and releasing communication between the first terminal device located in the network cell and a third terminal device located outside the network cell.

49. The radio access network of claim 48, further comprising a visitor-location database node configured to communicate with an access-centernode according to the SIP and to store and provide varying subscriber information allocated to each terminal-device address registered to the access network.

50. The radio access network of claim 48, having at least one access-center node for providing communication between at least two assigned subordinate access-point nodes to network cells of a radio access network, or between an assigned subordinate access-point node and an assigned superordinate core-network node, and further comprising a protocol-mapping node, configured to communicate with a gateway node of a core network and with a second number of access-center nodes and to translate control data of a first communication protocol used by a predetermined core-network node into session initiation protocol (SIP) control data, and to translate the SIP control data into control data of a first communication protocol.

51. The radio access network of claim 50, further comprising a home-location database node configured to communicate with an access-centernode according to the SIP and to store and provide to the access-center node permanent subscriber information allocated to each terminal-device address registered to the radio access network.

52. A method for providing wireless communication capability to a first terminal device located in a network cell of a radio access network, the method comprising the steps of:

ascertaining at an access-point node located in the network cell of the first terminal device whether an incoming communication request originates from the first terminal device and whether the incoming communication request is directed to the second terminal device located inside the network cell, upon reception of the communication request originating and terminating inside the network cell, establishing and maintaining a local user-data radio channel consisting of a first local channel section having as endpoints the first terminal device located in the network cell and the access-point node, and of a second local channel section having as endpoints the access-point node and a second terminal device located in the network cell, and upon reception of a communication request originating from or terminating at the first terminal device inside the network cell, establishing and maintaining the first local channel section, and exchanging packetized user data and control data with an assigned superordinate access-center node for establishing, maintaining and releasing communication between the first terminal device and a third terminal device located outside the network cell.

53. The method of claim 52, further comprising a step of exchanging control data between the access-point node and the first or second terminal device through at least one control-data radio channel for establishing, maintaining or releasing the local user-data radio channel.

54. The method of claim 52, further comprising steps of packetizing and sending to the access-center node control data received from the first terminal device in relation to a registration of the first terminal device with a core network connected with the access-point node.

55. The method of claim 52, further comprising using control messages according to a session initiation protocol, (SIP),.

56. The method of claim 52, wherein providing wireless communication between the first terminal device and a fourth terminal device located outside the coverage of the access-center node further comprises ascertaining at the access-center node that the incoming communication request involves the first terminal device and a fourth terminal device, and exchanging the packetized user data and control data with the first access-point node and with an assigned superordinate core network node in a core network for establishing, maintaining and releasing a wide-area user-data transmission path section consisting of a first regional transmission path section having as endpoints the first access-point node and the access-center node and a third regional transmission path section having as endpoints the access-center node and the core-network node.

57. The method of claim 56, wherein exchanging the packetized control data and exchanging the packetized user data between an access-point node and the access-center node, and between the access-center node and the core-network node comprises generating data packets according to an internet protocol(IP), wherein an individual data packet inclues the packetized user data or the packetized control data.

58. The method of claim 52, comprising a step of maintaining a first access database located at the access-point node and comprising data related to terminal devices permanently or temporarily registered to the access-point node.

59. The method of claim 58, further comprising a step of performing an additional authentication procedure according to a (GSM) standard for a terminal device not held as permanently registered to the access-point node or an assigned superordinate access-center node.

60. The method of claim 58, further comprising the steps of sending a request for authentication from a terminal device located in the network cell to the access-point node, and performing a check of validity of the terminal device, wherein performing the check of validity comprises accessing the first access database or a second access database maintained at the access-center node.

61. The method of claim 60, wherein the step of sending the request for authentication comprises including an international-mobile-subscriber-identity (IMSI) value of the terminal device into the request, and which further comprises the steps of
  extracting the IMSI value from the request for authentication at the access-point node,
  ascertaining at the access-point node whether the IMSI value is allocated to a registered terminal device held as registered to the access-point node in the first access data base, and
  generating and transmit a random number to the registered terminal device.

62. The method of claim 60, further comprising the steps of
  ascertaining whether an IMSI value is allocated to a registered terminal device held as permanently registered to the access-point node in the first access data base, and
  sending to the access-center node a third control message indicating that the IMSI value of the registered terminal device is not contained in the first access data base,
  waiting for reception of a fourth control message from the access-center node indicating that the registered terminal device is registered with an external access-point node allocated to the access-center node, and
  sending to the registered terminal device a fifth control message indicating completion of a location update, if the IMSI value is contained in the first access data base or the fourth control message has been received from the access-center node.

63. The method of claim 52, wherein providing wireless communication between the first terminal device and a third terminal device located in a coverage of a different access-point node further comprises
  ascertaining at the access-center node that the incoming communication request originates from the first terminal device and that the incoming communication request is directed to a terminating terminal device located inside a network cell of another assigned subordinate access-point node, and
  upon reception of a communication request originating and terminating in network cells of assigned subordinate first and second access-point nodes, exchanging packetized user data and control data with the first access-point node and with the second access-point node to establish, maintain and release a predefined transmission capacity for a regional packet-switched user-data transmission path consisting of a first regional transmission path section having as endpoints the first access-point node and the access-center node, and further consisting of a second regional transmission path section having as endpoints the access-center node and the second access-point node.

64. The method of claim 63, wherein the ascertaining step comprises accessing a second access data base located at the access-center node and having data related to terminal devices permanently or temporarily registered to all access-point nodes assigned to the access-center node.

65. The method of claim 63, further comprising the steps of
  receiving at the access-center node a first control message from the first access-point node indicating that an IMSI value contained in an authentication request message of a requesting terminal device is not contained in its first access database,
  ascertaining whether the IMSI value is allocated to a registered terminal device held as registered to one of the access-point nodes assigned to the access-center node, and
  transmitting a second control message to the access-point node, the second control message indicating that the registered terminal device is registered with a second access-point node allocated to the access-center node.

66. The method of claim 63, further comprising a step of storing in the second access data base an entry allocated to a requesting terminal device requesting authentication, indicating that the requesting terminal device is currently in a coverage of the access-point node, which sent the first control message.

67. The method of claim 63, further comprising the steps of
  receiving at the access-center node from an assigned first access-point node a third control message indicating that an IMSI value of a terminal device, for which a location update procedure is being performed at the access-point node, is not contained in the first access data base,
  ascertaining at the access-center node that the IMSI value is allocated to a registered terminal device held as registered to one of the access-point nodes assigned to the access-center node, and
  transmitting a fourth control message to the first access-point node indicating that the registered terminal device is registered with a second access-point node allocated to the access-center node.

68. The method of claim 67, further comprising the steps of
  sending a sixth control message to the second access-point node requesting a validity status of the IMSI value received from the first access-point node,
  waiting for a seventh control message indicating the validity status, and
  transmitting the fourth control message to the first access-point node only if the seventh control message indicates that the IMSI value is valid.

69. The method of claim 68, further comprising the steps of
  sending to a gateway node an eighth control message indicating that the IMSI value of a terminal device is not contained in the second access data base,
  waiting for reception of a ninth control message from the gateway node indicating that the registered terminal device is registered with an external radio access network, and
  sending to the first access-point an tenth control message indicating the terminal device is not contained in the second access database.

* * * * *